(12) United States Patent
Tatewaki et al.

(10) Patent No.: US 12,548,164 B2
(45) Date of Patent: Feb. 10, 2026

(54) IMAGE PROCESSING METHOD, PROGRAM, AND IMAGE PROCESSING DEVICE

(71) Applicants: TOHOKU UNIVERSITY, Sendai (JP); NATIONAL UNIVERSITY CORPORATION KUMAMOTO UNIVERSITY, Kumamoto (JP)

(72) Inventors: Yasuko Tatewaki, Sendai (JP); Tetsuya Yoneda, Kumamoto (JP); Akira Arai, Sendai (JP)

(73) Assignees: TOHOKU UNIVERSITY, Miyagi (JP); NATIONAL UNIVERSITY CORPORATION KUMAMOTO UNIVERSITY, Kumamoto (JP)

( * ) Notice: Subject to any disclaimer, the term of this patent is extended or adjusted under 35 U.S.C. 154(b) by 258 days.

(21) Appl. No.: 18/547,825

(22) PCT Filed: Feb. 24, 2022

(86) PCT No.: PCT/JP2022/007747
§ 371 (c)(1),
(2) Date: Aug. 24, 2023

(87) PCT Pub. No.: WO2022/181726
PCT Pub. Date: Sep. 1, 2022

(65) Prior Publication Data
US 2024/0303819 A1   Sep. 12, 2024

(30) Foreign Application Priority Data

Feb. 25, 2021   (JP) .................................. 2021-029161

(51) Int. Cl.
*G06T 7/11*   (2017.01)
*A61B 5/00*   (2006.01)
(Continued)

(52) U.S. Cl.
CPC .............. *G06T 7/11* (2017.01); *A61B 5/0042* (2013.01); *A61B 5/055* (2013.01);
(Continued)

(58) Field of Classification Search
CPC . G06T 7/11; G06T 7/174; G06T 7/155; G06T 7/0012; G06T 2207/10088;
(Continued)

(56) References Cited

U.S. PATENT DOCUMENTS

2008/0119721 A1   5/2008   Kimura et al.
2008/0119731 A1   5/2008   Kimura et al.
(Continued)

FOREIGN PATENT DOCUMENTS

JP   2009-268741 A   11/2009
JP   2015-047224 A   3/2015
(Continued)

OTHER PUBLICATIONS

Tateishi et al., "Differentiating between Alzheimer Disease Patients and Controls with Phase-difference-enhanced Imaging at 3T: a Feasibility Study", Magnetic Resonance in Medical Sciences, vol. 17, No. 4, Jan. 15, 2018, pp. 283-292.
(Continued)

*Primary Examiner* — Allen H Nguyen
(74) *Attorney, Agent, or Firm* — Dority & Manning, P.A.

(57) ABSTRACT

An image processing method includes: a step of creating, by a blood vessel mask creation unit, a blood vessel mask image by removing a punctate low signal intensity, removing a linear low signal intensity, extracting the linear low signal intensity, removing a punctate high signal intensity, removing a linear high signal intensity, and extracting the linear high signal intensity from an image obtained from a magnetic resonance signal intensity in which a region corresponding to a blood vessel is enhanced with respect to an (Continued)

MRI image; and a step of generating, by a mask processing unit, an image in which a blood vessel structure is removed using the blood vessel mask image from a phase difference enhanced image created from the MRI image.

12 Claims, 42 Drawing Sheets

(51) Int. Cl.
 *A61B 5/055* (2006.01)
 *G01R 33/56* (2006.01)
 *G06T 7/00* (2017.01)
 *G06T 7/155* (2017.01)
 *G06T 7/174* (2017.01)

(52) U.S. Cl.
 CPC ........ *G01R 33/5608* (2013.01); *G06T 7/0012* (2013.01); *G06T 7/155* (2017.01); *G06T 7/174* (2017.01); *G06T 2207/10088* (2013.01); *G06T 2207/20036* (2013.01); *G06T 2207/30016* (2013.01); *G06T 2207/30101* (2013.01)

(58) Field of Classification Search
 CPC . G06T 2207/20036; G06T 2207/30016; G06T 2207/30101; A61B 5/0042; A61B 5/055; G01R 33/5608
 USPC ........................................................ 382/131
 See application file for complete search history.

(56) References Cited

U.S. PATENT DOCUMENTS

| 2011/0304330 | A1 | 12/2011 | Yoneda et al. |
| 2018/0192870 | A1* | 7/2018 | Inao ........................... G06T 5/50 |
| 2018/0292491 | A1* | 10/2018 | Koch ................... G01R 33/583 |
| 2020/0077893 | A1* | 3/2020 | Shirai ................ A61B 5/02007 |
| 2020/0219251 | A1 | 7/2020 | Kahashi et al. |
| 2023/0123738 | A1 | 4/2023 | Yoneda |

FOREIGN PATENT DOCUMENTS

| JP | 2021-006250 A | 1/2021 |
| KR | 10-2017-0086929 A | 7/2017 |
| WO | WO 2017/182303 A1 | 10/2017 |

OTHER PUBLICATIONS

Tzourio-Mazoyer et al., "Automated Anatomical Labeling of Activations in SPM Using a Macroscopic Anatomical Parcellation of the MNI MRI Single-Subject Brain", NueroImage vol. 15, Issue 1, 2002, pp. 273-289.

International Search Report (with English translation) for Application No. PCT/JP2022/007747, dated May 10, 2022, 6 pages.

Japanese Office Action (w/English translation) for corresponding Application No. 2023-502507, mailed on Jul. 29, 2025, 5 pages.

\* cited by examiner

MRI-PADRE     PiB-PET

MRI-PADRE     PiB-PET

FIG. 15
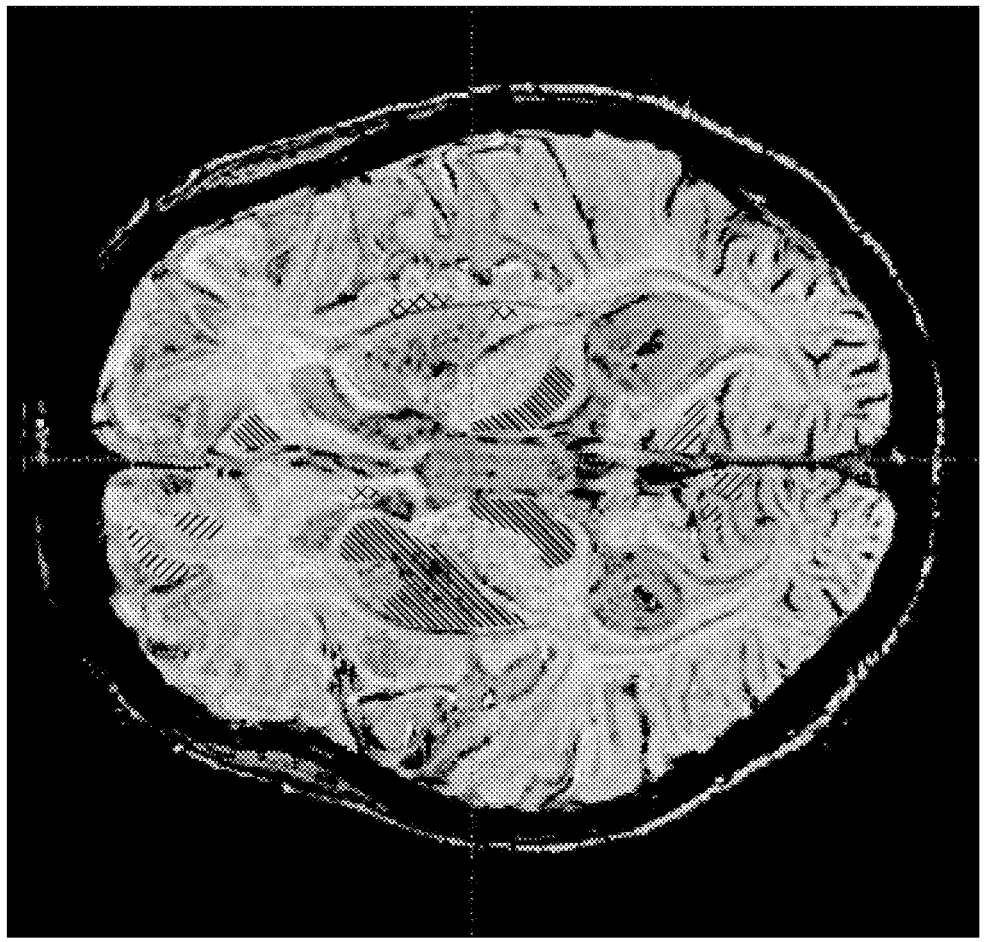
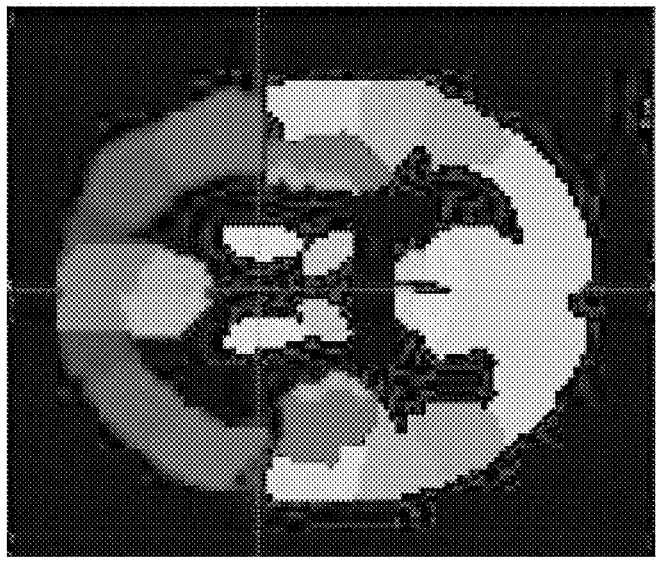

FIG. 26
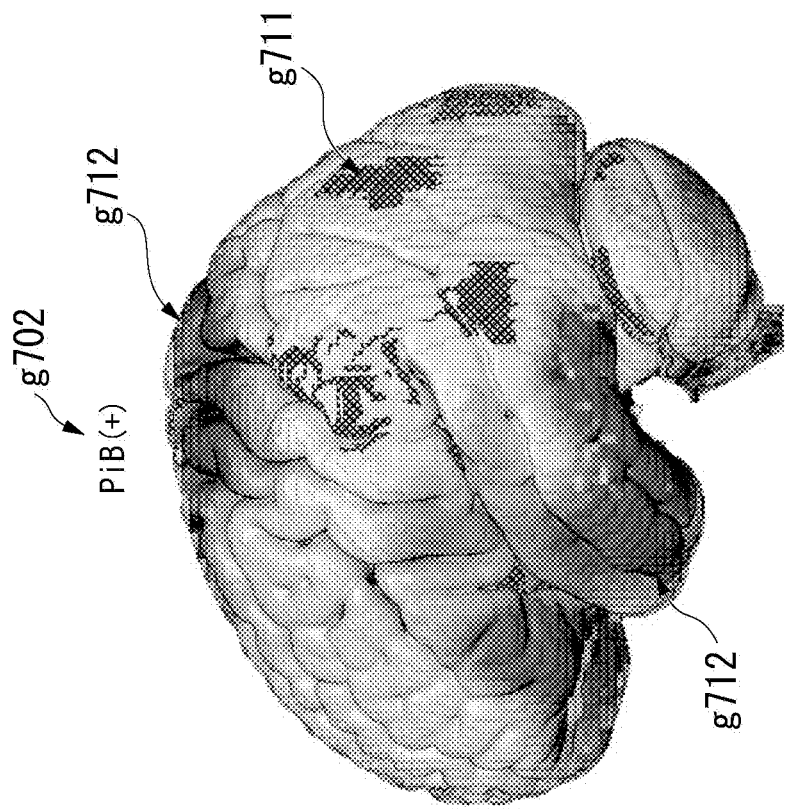
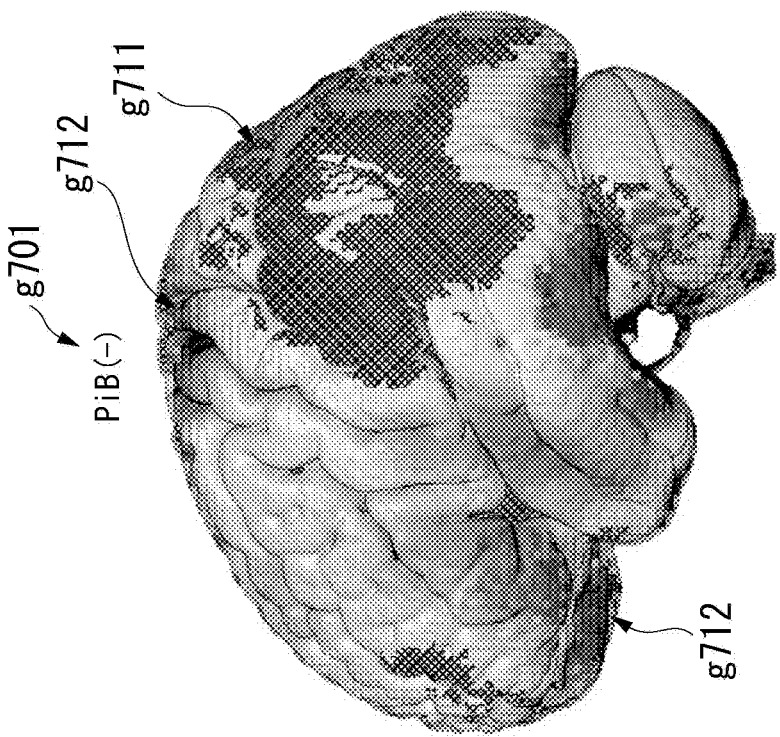

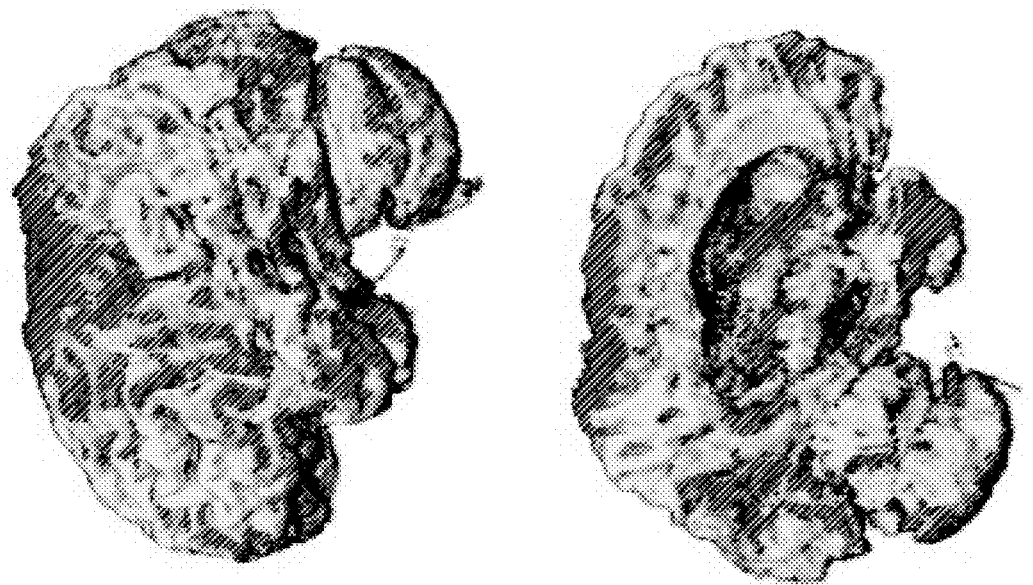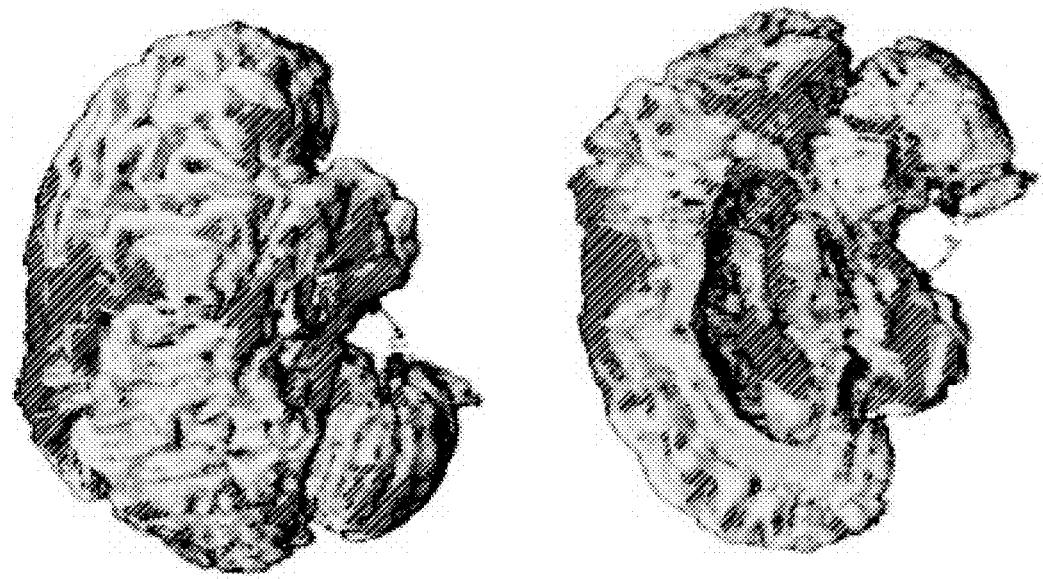
FIG. 29

FIG. 31

| ID | DOCTOR 1 | DOCTOR 2 | DOCTOR 3 | MAJORITY DECISION | PiB | |
|---|---|---|---|---|---|---|
| 1 | + | + | + | + | + | |
| 2 | − | − | − | − | − | |
| 3 | − | − | − | − | − | |
| 4 | + | + | + | + | + | |
| 5 | − | − | − | − | − | |
| 6 | − | − | − | − | − | |
| 7 | − | + | − | − | + | g801 |
| 8 | + | + | − | + | + | |
| 9 | + | − | − | − | + | |
| 10 | + | + | + | + | + | |
| 11 | − | − | − | − | − | |
| True Posi | 5 | 5 | 3 | 4 | | |
| False Posi | 0 | 0 | 0 | 0 | | |
| True Nega | 5 | 5 | 5 | 5 | | |
| False Nega | 1 | 1 | 3 | 2 | | |
| Sensitivity | 0.833 | 0.833 | 0.500 | 0.677 | | g802 |
| Specificity | 1.000 | 1.000 | 1.000 | 1.000 | | |
| PPV | 1.000 | 1.000 | 1.000 | 1.000 | | |
| NPV | 0.833 | 0.833 | 0.625 | 0.714 | | |
| Accuracy | 0.909 | 0.909 | 0.727 | 0.818 | | |

FIG. 35 g851

| reference for normalization | non-AD vs MCI,AD (65:127) cerebellum | non-AD vs MCI,AD (65:127) hippocampus |
|---|---|---|
| ROI | P prob<t (prob>t) | P prob<t (prob>t) |
| Precentral L | 0.0751 | 0.0069 |
| Precentral R | 0.1576 | 0.0139 |
| Frontal Sup L | 0.8104 | 0.0834 |
| Frontal Sup R | 0.5517 | 0.0336 |
| Frontal Sup Orb L | 0.0513 | 0.0062 |
| Frontal Sup Orb R | 0.2111 | 0.0212 |
| Frontal Mid L | 0.1406 | 0.005 |
| Frontal Mid R | 0.1934 | 0.0057 |
| Frontal Mid Orb L | 0.1451 | 0.0096 |
| Frontal Mid Orb R | 0.0652 | 0.0042 |
| Frontal Inf Oper L | 0.0137 | 0.0009 |
| Frontal Inf Oper R | 0.1308 | 0.007 |
| Frontal Inf Tri L | 0.1426 | 0.0116 |
| Frontal Inf Tri R | 0.2254 | 0.024 |
| Frontal Inf Orb L | 0.1314 | 0.0088 |
| Frontal Inf Orb R | 0.6511 | 0.091 |
| Rolandic Oper L | 0.0333 | 0.0014 | g852

| reference for normalization | non-AD vs MCI,AD (65:127) cerebellum | non-AD vs MCI,AD (65:127) hippocampus |
|---|---|---|
| ROI | P prob<t (prob>t) | P prob<t (prob>t) |
| Rolandic Oper R | 0.1506 | 0.0047 |
| Supp Motor L | 0.2119 | 0.0133 |
| Supp Motor R | 0.2458 | 0.0227 |
| Olfactory L | 0.1788 | 0.0276 |
| Olfactory R | 0.0607 | 0.0055 |
| Frontal Sup Medial L | 0.5521 | 0.0386 |
| Frontal Sup Medial R | 0.5338 | 0.0262 |
| Frontal Sup Medial Orb L | 0.4749 | 0.0794 |
| Frontal Sup Medial Orb R | 0.4094 | 0.0499 |
| Rectus L | 0.1158 | 0.0234 |
| Rectus R | 0.036 | 0.009 |
| Insula L | 0.4606 | 0.0198 |
| Insula R | 0.8993 | 0.1899 |
| Cingulum Ant L | 0.1101 | 0.0047 |
| Cingulum Ant R | 0.3461 | 0.0179 |
| Cingulum Mid L | 0.3183 | 0.0068 |
| Cingulum Mid R | 0.6728 | 0.0442 |
| Cingulum Post L | 0.3623 | 0.0218 |
| Cingulum Post R | 0.5499 | 0.0761 |
| Hippocampus L | 0.9809(0.0191) | 0.6075 |

FIG. 36 g853

| reference for normalization | non-AD vs MCI, AD (65:127) | |
|---|---|---|
| | cerebellum | hippocampus |
| ROI | P prob<t (prob>t) | P prob<t (prob>t) |
| Hippocampus R | 0.9528(0.0472) | 0.3925 |
| ParaHippo L | 0.9691(0.0309) | 0.5206 |
| ParaHippo R | 0.8274 | 0.1266 |
| Amygdala L | 0.8001 | 0.3653 |
| Amygdala R | 0.9091 | 0.5825 |
| Calcarine L | 0.7699 | 0.0965 |
| Calcarine R | 0.5944 | 0.0341 |
| Cuneus L | 0.4939 | 0.0306 |
| Cuneus R | 0.6138 | 0.0358 |
| Lingual L | 0.4585 | 0.0369 |
| Lingual R | 0.8518 | 0.1576 |
| Occipital Sup L | 0.7157 | 0.0632 |
| Occipital Sup R | 0.4747 | 0.0184 |
| Occipital Mid L | 0.475 | 0.0233 |
| Occipital Mid R | 0.0102 | 0.0003 |
| Occipital Inf L | 0.4744 | 0.0823 |
| Occipital Inf R | 0.0188 | 0.0024 |
| Fusiform L | 0.3518 | 0.0104 |
| Fusiform R | 0.6221 | 0.0354 |
| Postcentral L | 0.2624 | 0.0265 | g854

| reference for normalization | non-AD vs MCI, AD (65:127) | |
|---|---|---|
| | cerebellum | hippocampus |
| ROI | P prob<t (prob>t) | P prob<t (prob>t) |
| Postcentral R | 0.1035 | 0.0057 |
| Parietal Sup L | 0.3632 | 0.0234 |
| Parietal Sup R | 0.17335 | 0.0028 |
| Parietal Inf L | 0.0927 | 0.0038 |
| Parietal Inf R | 0.0265 | 0.0008 |
| SupraMarginal L | 0.0928 | 0.0037 |
| SupraMarginal R | 0.0025 | 0.0002 |
| Angular L | 0.2311 | 0.0094 |
| Angular R | 0.0055 | 0.0001 |
| Precuneus L | 0.2122 | 0.0055 |
| Precuneus R | 0.3512 | 0.0094 |
| Paracentral Lob L | 0.0942 | 0.014 |
| Paracentral Lob R | 0.0114 | 0.0012 |
| Caudate L | 0.0204 | 0.0033 |
| Caudate R | 0.0397 | 0.0089 |
| Putamen L | 0.294 | 0.1339 |
| Putamen R | 0.037 | 0.0145 |
| Pallidum L | 0.109 | 0.0607 |
| Pallidum R | 0.0647 | 0.0349 |
| Thalamus L | 0.7951 | 0.2078 |

FIG. 37 g855

| | non-AD vs MCI,AD (65:127) | |
|---|---|---|
| reference for normalization | cerebellum | hippocampus |
| ROI | P prob<t (prob>t) | P prob<t (prob>t) |
| Thalamus R | 0.4725 | 0.0696 |
| Heschl L | 0.5812 | 0.1377 |
| Heschl R | 0.6643 | 0.1355 |
| Temporal Sup L | 0.0167 | 0.0022 |
| Temporal Sup R | 0.0004 | 0.0002 |
| Temporal Pole Sup L | 0.067 | 0.0036 |
| Temporal Pole Sup R | 0.0006 | <0.0001 |
| Temporal Mid L | 0.0279 | 0.002 |
| Temporal Mid R | 0.0024 | 0.0005 |
| Temporal Pole Mid L | 0.0489 | 0.004 |
| Temporal Pole Mid R | 0.0406 | 0.0032 |
| Temporal Inf L | 0.033 | 0.0052 |
| Temporal InfR | 0.012 | 0.0018 |

FIG. 38 g861

| reference for normalization ROI | non-AD vs AD (65-91) | |
|---|---|---|
| | cerebellum P prob<t (prob>t) | hippocampus P prob<t (prob>t) |
| Precentral L | 0.0832 | 0.0008 |
| Precentral R | 0.1495 | 0.0017 |
| Frontal Sup L | 0.8449 | 0.0164 |
| Frontal Sup R | 0.6097 | 0.0053 |
| Frontal Sup Orb L | 0.0926 | 0.002 |
| Frontal Sup Orb R | 0.1771 | 0.0035 |
| Frontal Mid L | 0.1678 | 0.0003 |
| Frontal Mid R | 0.1223 | 0.0001 |
| Frontal Mid Orb L | 0.0798 | 0.0004 |
| Frontal Mid Orb R | 0.0589 | 0.0003 |
| Frontal Inf Oper L | 0.0099 | <0.0001 |
| Frontal Inf Oper R | 0.1217 | 0.0005 |
| Frontal Inf Tri L | 0.1284 | 0.001 |
| Frontal Inf Tri R | 0.0533 | 0.0007 |
| Frontal Inf Orb L | 0.0968 | 0.0005 |
| Frontal Inf Orb R | 0.5508 | 0.0168 |
| Rolandic Oper L | 0.0249 | <0.0001 | g862

| reference for normalization ROI | non-AD vs AD (65-91) | |
|---|---|---|
| | cerebellum P prob<t (prob>t) | hippocampus P prob<t (prob>t) |
| Rolandic Oper R | 0.1806 | 0.0003 |
| Supp Motor L | 0.2468 | 0.0019 |
| Supp Motor R | 0.1727 | 0.0021 |
| Olfactory L | 0.3354 | 0.0202 |
| Olfactory R | 0.0647 | 0.0011 |
| Frontal Sup Medial L | 0.4159 | 0.0024 |
| Frontal Sup Medial R | 0.6328 | 0.0057 |
| Frontal Sup Medial Orb L | 0.4362 | 0.0184 |
| Frontal Sup Medial Orb R | 0.2403 | 0.0027 |
| Rectus L | 0.0864 | 0.0054 |
| Rectus R | 0.0143 | 0.001 |
| Insula L | 0.6257 | 0.0055 |
| Insula R | 0.9145 | 0.0451 |
| Cingulum Ant L | 0.0625 | 0.0001 |
| Cingulum Ant R | 0.3707 | 0.0024 |
| Cingulum Mid L | 0.3388 | 0.0004 |
| Cingulum Mid R | 0.7224 | 0.0059 |
| Cingulum Post L | 0.5023 | 0.0084 |
| Cingulum Post R | 0.7981 | 0.0794 |
| Hippocampus L | 0.9965(0.0035) | 0.5041 |

FIG. 39 g863

| reference for normalization | non-AD vs AD (65:91) | |
|---|---|---|
| | cerebellum | hippocampus |
| ROI | P prob<t (prob>t) | P prob<t (prob>t) |
| Hippocampus R | 0.9951(0.0049) | 0.4959 |
| ParaHippo L | 0.9895(0.0105) | 0.3971 |
| ParaHippo R | 0.9238 | 0.0607 |
| Amygdala L | 0.8289 | 0.2372 |
| Amygdala R | 0.8434 | 0.8387 |
| Calcarine L | 0.6928 | 0.0362 |
| Calcarine R | 0.4716 | 0.0058 |
| Cuneus L | 0.6167 | 0.0037 |
| Cuneus R | 0.5018 | 0.0047 |
| Lingual L | 0.8507 | 0.0068 |
| Lingual R | 0.8559 | 0.0442 |
| Occipital Sup L | 0.5463 | 0.0278 |
| Occipital Sup R | 0.7204 | 0.0024 |
| Occipital Mid L | 0.0249 | 0.0078 |
| Occipital Mid R | 0.4375 | <0.0001 |
| Occipital Inf L | 0.019 | 0.02026 |
| Occipital Inf R | 0.3701 | 0.0004 |
| Fusiform L | 0.5579 | 0.0007 |
| Fusiform R | 0.1817 | 0.003 |
| Postcentral L | 0.0542 | 0.0029 | g864

| reference for normalization | non-AD vs AD (65:91) | |
|---|---|---|
| | cerebellum | hippocampus |
| ROI | P prob<t (prob>t) | P prob<t (prob>t) |
| Postcentral R | 0.5911 | 0.0002 |
| Parietal Sup L | 0.3942 | 0.0114 |
| Parietal Sup R | 0.0747 | 0.0011 |
| Parietal Inf L | 0.0193 | 0.0002 |
| Parietal Inf R | 0.0153 | <0.0001 |
| SupraMarginal L | 0.1174 | 0.0006 |
| SupraMarginal R | 0.0013 | <0.0001 |
| Angular L | 0.3533 | 0.0019 |
| Angular R | 0.0073 | <0.0001 |
| Precuneus L | 0.3374 | 0.0007 |
| Precuneus R | 0.4377 | 0.0007 |
| Paracentral Lob L | 0.0649 | 0.0016 |
| Paracentral Lob R | 0.0013 | <0.0001 |
| Caudate L | 0.0146 | 0.0004 |
| Caudate R | 0.0186 | 0.0011 |
| Putamen L | 0.2015 | 0.0484 |
| Putamen R | 0.0127 | 0.0019 |
| Pallidum L | 0.0302 | 0.0093 |
| Pallidum R | 0.0402 | 0.0117 |
| Thalamus L | 0.835 | 0.0894 |

FIG. 40 g865

| | non-AD vs AD (65:91) | |
|---|---|---|
| reference for normalization | cerebellum | hippocampus |
| ROI | P prob<t (prob>t) | P prob<t (prob>t) |
| Thalamus R | 0.6944 | 0.0543 |
| Heschl L | 0.6003 | 0.0575 |
| Heschl R | 0.7314 | 0.0681 |
| Temporal Sup L | 0.0254 | 0.0003 |
| Temporal Sup R | 0.0005 | <0.0001 |
| Temporal Pole Sup L | 0.0373 | 0.0001 |
| Temporal Pole Sup R | 0.0006 | <0.0001 |
| Temporal Mid L | 0.0361 | 0.0001 |
| Temporal Mid R | 0.0007 | <0.0001 |
| Temporal Pole Mid L | 0.0507 | 0.0004 |
| Temporal Pole Mid R | 0.01 | <0.0001 |
| Temporal Inf L | 0.0135 | 0.0002 |
| Temporal InfR | 0.0028 | <0.0001 |

FIG. 41 g871

| reference for normalization | PiB+ vs PiB-(6:5) | |
|---|---|---|
| | cerebellum | hippocampus |
| ROI | P prob<t (prob>t) | P prob<t (prob>t) |
| Precentral L | 0.1012 | 0.1775 |
| Precentral R | 0.3795 | 0.7922 |
| Frontal Sup L | 0.2543 | 0.7922 |
| Frontal Sup R | 0.4338 | 0.9307 |
| Frontal Sup Orb L | 0.3828 | 0.9307 |
| Frontal Sup Orb R | 0.0291 | 0.01732 |
| Frontal Mid L | 0.3411 | 0.9307 |
| Frontal Mid R | 0.4034 | 0.4286 |
| Frontal Mid Orb L | 0.2992 | 0.2468 |
| Frontal Mid Orb R | 0.24 | 0.1775 |
| Frontal Inf Oper L | 0.0626 | 0.6623 |
| Frontal Inf Oper R | 0.3394 | 0.7922 |
| Frontal Inf Tri L | 0.4597 | 0.9307 |
| Frontal Inf Tri R | 0.4319 | 0.5368 |
| Frontal Inf Orb L | 0.2684 | 0.05195 |
| Frontal Inf Orb R | 0.0184 | 0.1775 |
| Rolandic Oper L | 0.025 | | g872

| reference for normalization | PiB+ vs PiB-(6:5) | |
|---|---|---|
| | cerebellum | hippocampus |
| ROI | P prob<t (prob>t) | P prob<t (prob>t) |
| Rolandic Oper R | 0.038 | 0.08225 |
| Supp Motor L | 0.1341 | 0.2468 |
| Supp Motor R | 0.4814 | 0.7922 |
| Olfactory L | 0.3477 | 0.329 |
| Olfactory R | 0.4817 | 1 |
| Frontal Sup Medial L | 0.2602 | 0.7922 |
| Frontal Sup Medial R | 0.3137 | 0.9307 |
| Frontal Sup Medial Orb L | 0.1979 | 0.4286 |
| Frontal Sup Medial Orb R | 0.3452 | 0.9307 |
| Rectus L | 0.2719 | 0.9307 |
| Rectus R | 0.2371 | 0.4286 |
| Insula L | 0.4644 | 1 |
| Insula R | 0.1175 | 0.1775 |
| Cingulum Ant L | 0.1936 | 0.1775 |
| Cingulum Ant R | 0.4039 | 0.7922 |
| Cingulum Mid L | 0.1819 | 0.7922 |
| Cingulum Mid R | 0.3952 | 0.9307 |
| Cingulum Post L | 0.2061 | 0.329 |
| Cingulum Post R | 0.168 | 0.329 |
| Hippocampus L | 0.3194 | 1 |

FIG. 42 g873

| reference for normalization | PiB+ vs PiB- (6:5) | |
|---|---|---|
| ROI | cerebellum P prob<t (prob>t) | hippocampus P prob<t (prob>t) |
| Hippocampus R | 0.4234 | 1 |
| ParaHippo L | 0.1733 | 0.4286 |
| ParaHippo R | 0.4748 | 0.5368 |
| Amygdala L | 0.0778 | 0.08225 |
| Amygdala R | 0.391 | 1 |
| Calcarine L | 0.1582 | 0.329 |
| Calcarine R | 0.3756 | 0.4286 |
| Cuneus L | 0.0157 | 0.1255 |
| Cuneus R | 0.0676 | 0.2468 |
| Lingual L | 0.28 | 0.5368 |
| Lingual R | 0.1659 | 0.5368 |
| Occipital Sup L | 0.0511 | 0.329 |
| Occipital Sup R | 0.0008 | 0.01732 |
| Occipital Mid L | 0.0379 | 0.4286 |
| Occipital Mid R | 0.0021 | 0.0303 |
| Occipital Inf L | 0.095 | 0.4286 |
| Occipital Inf R | 0.3238 | 0.9307 |
| Fusiform L | 0.3478 | 0.9307 |
| Fusiform R | 0.2266 | 0.2468 |
| Postcentral L | 0.1478 | 0.4286 | g874

| reference for normalization | PiB+ vs PiB- (6:5) | |
|---|---|---|
| ROI | cerebellum P prob<t (prob>t) | hippocampus P prob<t (prob>t) |
| Postcentral R | 0.3391 | 0.6623 |
| Parietal Sup L | 0.0039 | 0.1775 |
| Parietal Sup R | 0.0146 | 0.1775 |
| Parietal Inf L | 0.0738 | 0.329 |
| Parietal Inf R | 0.3205 | 0.7922 |
| SupraMarginal L | 0.0445 | 0.08225 |
| SupraMarginal R | 0.0846 | 0.329 |
| Angular L | 0.0211 | 0.2468 |
| Angular R | 0.1882 | 0.4286 |
| Precuneus L | 0.1352 | 0.1775 |
| Precuneus R | 0.2568 | 0.4286 |
| Paracentral Lob L | 0.0363 | 0.1255 |
| Paracentral Lob R | 0.1731 | 0.4286 |
| Caudate L | 0.1833 | 0.1775 |
| Caudate R | 0.1553 | 0.5368 |
| Putamen L | 0.288 | 1 |
| Putamen R | 0.1927 | 0.1255 |
| Pallidum L | 0.0513 | 0.1255 |
| Pallidum R | 0.2625 | 0.7922 |
| Thalamus L | 0.2237 | 0.6623 |

FIG. 43 g875

| reference for normalization | PiB+ vs PiB-(6:5) | |
|---|---|---|
| | cerebellum | hippocampus |
| ROI | P prob<t (prob>t) | P prob<t (prob>t) |
| Thalamus R | 0.075 | 0.2468 |
| Heschl L | 0.2925 | 0.5368 |
| Heschl R | 0.4285 | 0.6623 |
| Temporal Sup L | 0.0929 | 0.329 |
| Temporal Sup R | 0.3875 | 0.5368 |
| Temporal Pole Sup L | 0.126 | 0.08225 |
| Temporal Pole Sup R | 0.1212 | 0.4286 |
| Temporal Mid L | 0.1158 | 0.5368 |
| Temporal Mid R | 0.063 | 0.2468 |
| Temporal Pole Mid L | 0.3206 | 0.6623 |
| Temporal Pole Mid R | 0.4359 | 0.9307 |
| Temporal Inf L | 0.0924 | 0.4286 |
| Temporal InfR | 0.0456 | 0.329 |

IMAGE PROCESSING METHOD, PROGRAM, AND IMAGE PROCESSING DEVICE

CROSS-REFERENCE TO RELATED APPLICATIONS

The present application is a US national phase application of International Patent Application No. PCT/JP2022/007747, filed on Feb. 24, 2022, which, in turn, is based upon and claims the right of priority to Japanese Patent Application No. 2021-029161, filed on Feb. 25, 2021, the contents of both which are hereby incorporated by reference herein in their entirety for all purposes.

TECHNICAL FIELD

The present invention relates to an image processing method, a program, and an image processing device.

The present application claims priority based on Japanese Patent Application No. 2021-029161 filed on Feb. 25, 2021, and contents thereof are incorporated by reference.

BACKGROUND ART

Amyloid β is a causative substance of Alzheimer's disease, which is a pathology of the number one cause of dementia. In a brain of a patient with Alzheimer's disease, the amyloid β is deposited from a stage, for example, 20 to 30 years before onset of the dementia, and therefore, detecting the amyloid β during an asymptomatic period has a great demand from viewpoints of early treatment and onset prevention of the dementia, monitoring in drug discovery, and the like. As a related technique for diagnosing amyloid β deposition in the brain, there is a positron emission tomography (PET) examination (amyloid PET) using a radioactive drug binding to the amyloid β, such as Pittsburgh compound-B (PiB). The amyloid PET is a useful image examination capable of visualizing the amyloid β deposition in the brain, but has disadvantages such as patient's exposure to radiation, high examination cost, and few facilities. Therefore, as a diagnostic method without exposure to radiation, research has been vigorously conducted to predict the amyloid β deposition in the brain by magnetic resonance imaging (MRI). For example, research has been conducted to predict amyloid β and age-related iron deposition in the brain based on a quantitative value referred to as quantitative susceptibility mapping (QSM) obtained based on phase component information on an MRI image. Further, a method has been proposed in which a phase corresponding to a tissue contrast to be enhanced is selected and enhanced by a phase difference enhances (PADRE) imaging method (see, for example, PTL 1). The PADRE method can improve the tissue resolution of target tissues such as amyloid plaques and blood vessels, for example, tissues and blood vessels.

Further, a visual evaluation by amyloid plaque-PADRE (AP-PADRE) has been proposed. It has been reported that a low signal intensity distribution of AP-PADRE in cerebral cortex shows a significant difference in a visual evaluation between patients clinically diagnosed with Alzheimer's disease (Alzheimer's dementia patients) and a control group, and a low signal intensity distribution in a superior temporal gyrus is positively correlated with a mini-mental state examination (MMSE) in the Alzheimer's disease patients (see, for example, NPL 1).

CITATION LIST

Patent Literature

PTL 1: WO2010/073923 pamphlet

Non Patent Literature

NPL 1: Tateishi M. et al., "Differentiating between Alzheimer Disease Patients and Controls with Phase-difference-enhanced Imaging at 3T: A Feasibility Study", Magn Reson Med Sci. 2018

SUMMARY OF INVENTION

Technical Problem

However, although the visual evaluation in NPL 1 is performed, it is not a comparative evaluation by extracting the amyloid, which is a cause of Alzheimer's disease, but only looks at a discrimination ability based on clinical symptoms. Further, in a method using an AP-PADRE image, it is difficult to distinguish between PiB-positive cases and PiB-negative cases only by a simple low signal intensity distribution in the cortex. PiB-positive refers to being diagnosed as positive in a PiB-PET examination, and PiB-negative refers to being diagnosed as negative in the PiB-PET examination. Further, in the PiB-positive cases, although there are tendencies such as an unclear cortico-medullary boundary and a regional difference in signal intensities in a created color map, which are not reliable. As described above, it is difficult to visually evaluate the amyloid β deposition in the related art.

The invention has been made in view of the above problems, and an object of the invention is to provide an image processing method, a program, and an image processing device capable of visually determining and quantitatively evaluating presence or absence of amyloid β deposition, and diagnosing presence or absence of Alzheimer's disease.

Solution to Problem (1) In order to achieve the above object, an image processing method according to one aspect of the invention includes: a step of creating, by a blood vessel mask creation unit, a blood vessel mask image by removing a punctate low signal intensity, removing a linear low signal intensity, extracting the linear low signal intensity, removing a punctate high signal intensity, removing a linear high signal intensity, and extracting the linear high signal intensity from an image obtained from a magnetic resonance signal intensity in which a region corresponding to a blood vessel is enhanced with respect to an MRI image; and a step of generating, by a mask processing unit, an image in which a blood vessel structure is removed using the blood vessel mask image from a phase difference enhanced image created from the MRI image.

(2) Further, the image processing method according to one aspect of the invention may further include: a step of separating, by a separation unit, a local low signal intensity and a diffuse component from the image from which the blood vessel structure has been removed; and a step of generating, by a brain surface projection image output unit, a brain surface projection image by projecting the diffuse component onto a brain surface.

(3) Further, in the image processing method according to one aspect of the invention, the blood vessel mask creation unit may create the blood vessel mask image by morphological operation processing, and the separation unit may separate the local low signal intensity and a diffuse component image by the morphological operation processing.

(4) Further, in the image processing method according to one aspect of the invention, the blood vessel mask creation unit may perform a step of removing the punctate low signal intensity by morphological operation processing using 3×3×3 linear kernels in 13 directions, a step of removing the linear low signal intensity from the image from which the punctate low signal intensity has been removed, by morphological operation processing using 3×3×3 planar kernels in 13 directions, a step of extracting the linear low signal intensity using the image from which the punctate low signal intensity has been removed and the image from which the linear low signal intensity has been removed, a step of removing the punctate high signal intensity by morphological operation processing using 3×3×3 linear kernels in 13 directions, a step of removing the linear high signal intensity from the image from which the punctate high signal intensity has been removed, by morphological operation processing using 3×3×3 planar kernels in 13 directions, and a step of extracting the linear high signal intensity using the image from which the punctate high signal intensity has been removed and the image from which the linear high signal intensity has been removed.

(5) Further, in the image processing method according to one aspect of the invention, the blood vessel mask creation unit may perform, for different pixel widths, processing of removing the punctate low signal intensity, processing of removing the linear low signal intensity, processing of extracting the linear low signal intensity, processing of removing the punctate high signal intensity, processing of removing the linear high signal intensity, and processing of extracting the linear high signal intensity.

(6) Further, in the image processing method according to one aspect of the invention, the separation unit may perform a step of separating the local low signal intensity having a size n by performing closing processing on the image from which the blood vessel structure has been removed, by morphological operation processing using a spherical kernel having a radius of p (p is an integer of 1 or more and n or less) pixels, and separating a diffuse image using p results obtained by performing, using a spherical kernel having a radius of n pixels, closing processing on the image from which the blood vessel structure has been removed.

(7) Further, in the image processing method according to one aspect of the invention, the phase difference enhanced image may be an AP-PADRE image created from the MRI image by an amyloid β-bound iron-phase difference enhanced imaging method.

(8) Further, in the image processing method according to one aspect of the invention, the blood vessel mask creation unit may extract information on a region of interest using the blood vessel mask image.

(9) Further, in the image processing method according to one aspect of the invention, the blood vessel mask creation unit may extract information on a region of interest by performing mask processing based on the blood vessel mask image, a template of the region of interest, information obtained by matching the acquired enhanced image to the phase difference enhanced image and aligning both images, and information obtained by transforming standardized information into an individual brain coordinate based on information obtained from a transformation vector field between the individual brain coordinate and a standard brain coordinate by transforming the enhanced image by nonlinear transformation and matching the transformed image with a template image of the enhanced image on the standard brain coordinate.

(10) In order to achieve the above object, a program according to one aspect of the invention causes a computer to create a blood vessel mask image by removing a punctate low signal intensity, removing a linear low signal intensity, extracting the linear low signal intensity, removing a punctate high signal intensity, removing a linear high signal intensity, and extracting the linear high signal intensity from an image obtained from a magnetic resonance signal intensity in which a region corresponding to a blood vessel is enhanced with respect to an MRI image; and generate an image in which a blood vessel structure is removed using the blood vessel mask image from a phase difference enhanced image created from the MRI image.

(11) In order to achieve the above object, an image processing device according to one aspect of the invention includes: a blood vessel mask creation unit configured to create a blood vessel mask image by removing a punctate low signal intensity, removing a linear low signal intensity, extracting the linear low signal intensity, removing a punctate high signal intensity, removing a linear high signal intensity, and extracting the linear high signal intensity from an image obtained from a magnetic resonance signal intensity in which a region corresponding to a blood vessel is enhanced with respect to an MRI image; and a mask processing unit configured to generate an image in which a blood vessel structure is removed using the blood vessel mask image from a phase difference enhanced image created from the MRI image.

(12) Further, in the image processing device according to one aspect of the invention, the blood vessel mask creation unit may extract information on a region of interest using the blood vessel mask image.

Advantageous Effects of Invention

According to the invention, the presence or absence of amyloid β deposition can be visually determined and quantitatively evaluated, and Alzheimer's disease can be diagnosed.

BRIEF DESCRIPTION OF DRAWINGS

FIG. 15 illustrates an example of an AAL atlas image set on a standard brain coordinate and an example of an image in which ROI based on AAL atlas is superimposed on the PADRE image.

FIG. 26 illustrates examples of images obtained by projecting, onto the brain surface, means of diffuse components extracted from the PADRE images for the PiB-negative group and the PiB-positive group.

FIG. 29 illustrates images obtained by removing a blood vessel and a low signal intensity from an MRI image of a PiB-positive person with mild cognitive impairment using the method according to the present embodiment, and mapping the extracted diffuse components onto the brain surface.

FIG. 31 is a table illustrating interpretation results for 11 subjects including FIG. 27 to FIG. 30.

FIG. 35 is a table illustrating results for a Non-AD group versus an MCI group+Alzheimer's dementia group in a fifth verification.

FIG. 36 is a table illustrating results for the Non-AD group versus the MCI group+Alzheimer's dementia group in the fifth verification.

FIG. 37 is a table illustrating results for the Non-AD group versus the MCI group+Alzheimer's dementia group in the fifth verification.

FIG. 38 is a table illustrating the results of a one-tailed t-test of the Non-AD group versus the Alzheimer's dementia group in the fifth verification.

FIG. 39 is a table illustrating results of the one-tailed t-test of the Non-AD group versus the Alzheimer's dementia group in the fifth verification.

FIG. 40 is a table illustrating results of the one-tailed t-test of the Non-AD group versus the Alzheimer's dementia group in the fifth verification.

FIG. 41 is a table illustrating results of a one-tailed t-test of similar ROI analysis results in both the PiB-negative group and the PiB-positive group for 11 cases having PiB data in the fifth verification.

FIG. 42 is a table illustrating results of the one-tailed t-test of the similar ROI analysis results in both the PiB-negative group and the PiB-positive group for 11 cases having PiB data in the fifth verification.

FIG. 43 is a table illustrating results of the one-tailed t-test of the similar ROI analysis results in both the PiB-negative group and the PiB-positive group for 11 cases having PiB data in the fifth verification.

DESCRIPTION OF EMBODIMENTS

Figure 1:
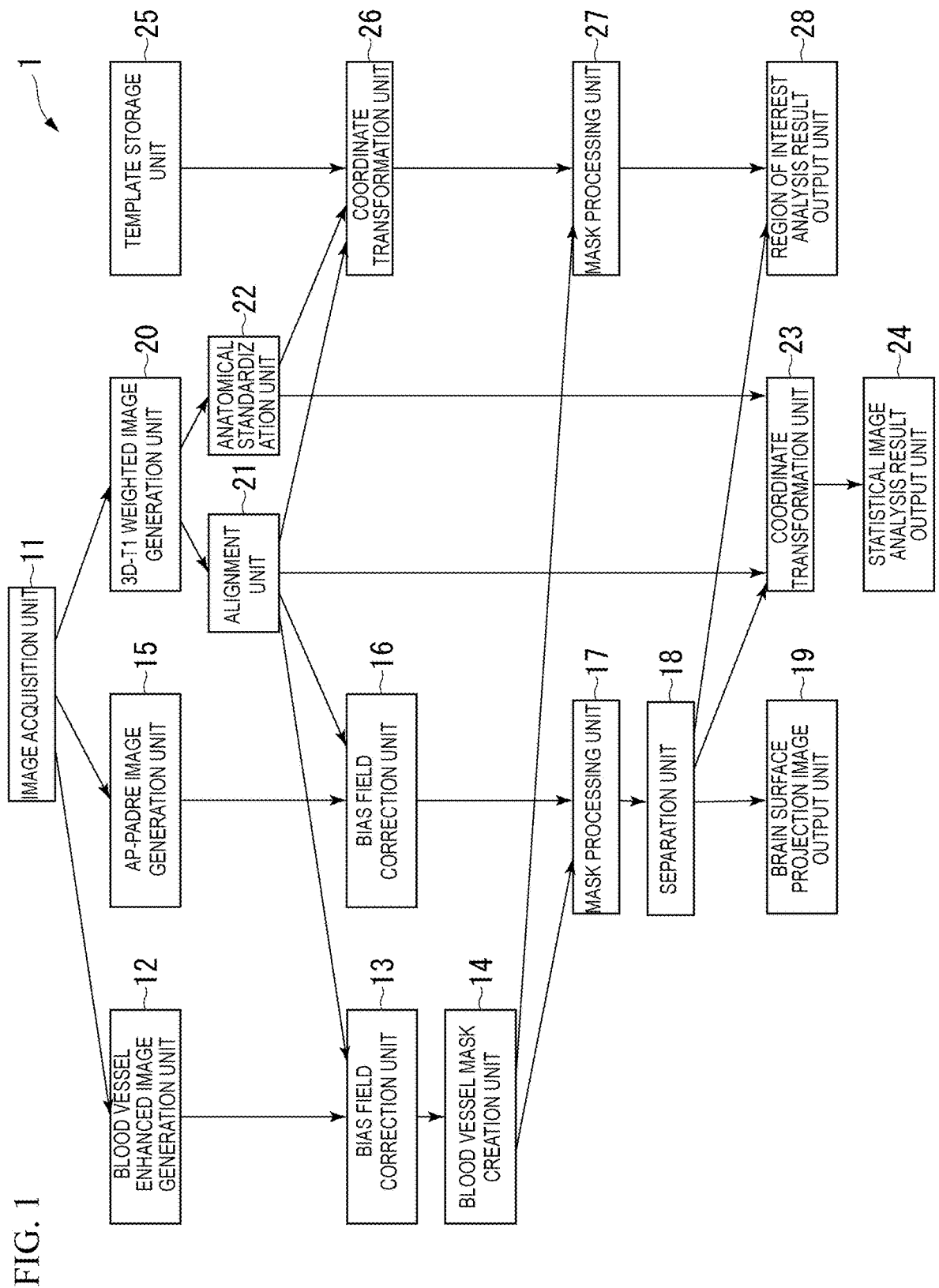
FIG. 1 is a diagram illustrating a configuration example of an image processing device according to an embodiment.

Hereinafter, an embodiment of the invention will be described with reference to the drawings. In the drawings to be used in the following description, a scale of each member is appropriately changed in order to make each member recognizable.

FIG. 1 is a diagram illustrating a configuration example of an image processing device 1 according to the present embodiment. As illustrated in FIG. 1, the image processing device 1 includes an image acquisition unit 11, a blood vessel enhanced image generation unit 12, a bias field correction unit 13, a blood vessel mask creation unit 14, an AP-PADRE image generation unit 15, a bias field correction unit 16, a mask processing unit 17, a separation unit 18, a brain surface projection image output unit 19, a 3D-T1 weighted image generation unit 20, an alignment unit 21, an anatomical standardization unit 22, a coordinate transformation unit 23, a statistical image analysis result output unit 24, a template storage unit 25, a coordinate transformation unit 26, a mask processing unit 27, and a region of interest analysis result output unit 28.

The image processing device 1 performs image processing on an acquired MRI image and outputs a brain surface projection image, a statistical image analysis result, and a region of interest analysis result.

The image acquisition unit 11 acquires two types of images, that is, an original image for PADRE based on an MRI image of a patient obtained from a magnetic resonance signal intensity and an original image for 3D-T1 weighted image generation. The image acquisition unit 11 outputs the acquired original image for PADRE to the blood vessel enhanced image generation unit 12 and the AP-PADRE image generation unit 15, and outputs the acquired original image for 3D-T1 weighted image generation to the 3D-T1 weighted image generation unit 20. The image acquisition unit 11 may acquire a blood vessel enhanced image, an AP-PADRE image, and a 3D-T1 weighted image from an external device.

The blood vessel enhanced image generation unit 12 generates, with respect to the original image for PADRE, a blood vessel enhanced image by enhancing a blood vessel portion of an image with a change in magnetic susceptibility by, for example, a susceptibility weighted imaging (SWI) reconstruction method. When the image acquisition unit 11 acquires a blood vessel enhanced image, the blood vessel enhanced image generation unit 12 outputs the blood vessel enhanced image output from the image acquisition unit 11 to the bias field correction unit 13.

The bias field correction unit 13 performs bias field correction on the blood vessel enhanced image using information output by the alignment unit 21. The bias field correction is correction for equalizing an influence of a magnetic field.

The blood vessel mask creation unit 14 generates a blood vessel mask image for removing a blood vessel structure from the bias field-corrected blood vessel enhanced image. A method of creating the blood vessel mask image will be described later.

The AP-PADRE image generation unit 15 generates an AP-PADRE image with respect to the original image for PADRE by a reconstruction method. When the image acquisition unit 11 acquires an AP-PADRE image, the AP-PADRE image generation unit 15 outputs the AP-PADRE image output from the image acquisition unit 11 to the bias field correction unit 16.

The bias field correction unit 16 performs bias field correction on the AP-PADRE image using the information output by the alignment unit 21 to obtain a corrected image. At the same time, a gray matter component image is obtained by tissue division.

The mask processing unit 17 applies a gray matter mask image obtained by binarizing a gray matter image output by the bias field correction unit 16 and the blood vessel mask image created by the blood vessel mask creation unit 14 to the bias field-corrected image output from the bias field correction unit 16 to remove a portion corresponding to a blood vessel and a portion other than a gray matter from the image.

The separation unit 18 separates a local low signal intensity component and a diffuse component from the image in which the image corresponding to the blood vessel has been removed. Separation processing will be described later.

The brain surface projection image output unit 19 outputs a brain surface projection image to an external device (for example, an image display device, or a print device) based on a result of separation by the separation unit 18.

The 3D-T1 weighted image generation unit 20 generates a T1 weighted image including a whole brain region by imaging using a gradient echo method, for example. The 3D-T1 weighted image is used in a process of mutual alignment with a PADRE image (a blood vessel enhanced image and an AP-PADRE image) and image anatomical standardization. When the image acquisition unit 11 acquires a 3D-T1 weighted image, the 3D-T1 weighted image generation unit 20 outputs the 3D-T1 weighted image output from the image acquisition unit 11 to the alignment unit 21 and the anatomical standardization unit 22.

The alignment unit 21 matches the 3D-T1 weighted image with the AP-PADRE image and aligns both images.

The anatomical standardization unit 22 obtains a transformation vector field between an individual brain coordinate and a standard brain coordinate by transforming the 3D-T1 weighted image by nonlinear transformation and matching the transformed 3D-T1 weighted image to a 3D-T1 template image (a T1 weighted image template) on the standard brain coordinate.

The coordinate transformation unit 23 transforms information output by the separation unit 18 into a standard brain coordinate based on information output by the anatomical standardization unit 22.

The statistical image analysis result output unit 24 analyzes a statistical image on a voxel basis by a well-known method based on information output by the coordinate transformation unit 23, and outputs an analysis result to the external device.

The template storage unit 25 stores a template of a region of interest. The template of the region of interest is used for, for example, ROI analysis described later.

The coordinate transformation unit 26 transforms standardized information into an individual brain coordinate based on the template of the region of interest stored in the template storage unit 25, the information output by the alignment unit 21, and the information output by the anatomical standardization unit 22.

The mask processing unit 27 extracts information on the region of interest by performing mask processing based on the blood vessel mask image created by the blood vessel mask creation unit 14 and information output by the coordinate transformation unit 26.

The region of interest analysis result output unit 28 analyzes the region of interest by a well-known method based on information output by the mask processing unit 27, and outputs an analysis result to the external device.

The configuration illustrated in FIG. 1 is an example, and the configuration is not limited thereto. The image processing device 1 may not include, for example, the 3D-T1 weighted image generation unit 20, the alignment unit 21, the anatomical standardization unit 22, the coordinate transformation unit 23, the statistical image analysis result output unit 24, the template storage unit 25, the coordinate transformation unit 26, the mask processing unit 27, and the region of interest analysis result output unit 28.

(AP-PADRE)

Figure 2:
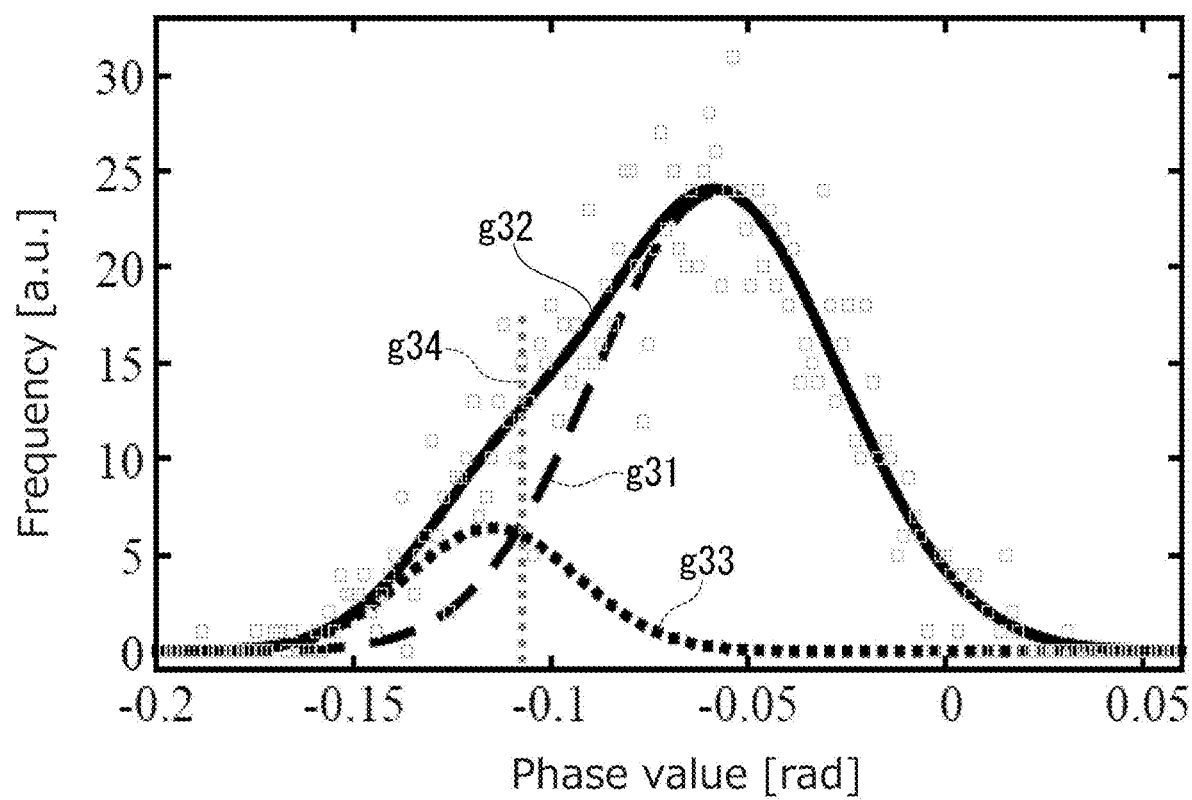
FIG. 2 is a graph illustrating a two components model for illustrating an outline of AP-PADRE.

Here, an outline of AP-PADRE will be described. FIG. 2 is a graph illustrating a two components model for illustrating the outline of the AP-PADRE. In FIG. 2, a horizontal axis represents a phase (rad), and a vertical axis represents the number of voxels (frequency of distribution). A chain line g31 is a distribution of phase image data (a phase distribution) collected from a region of interest (ROI), a chain line g32 is a phase distribution of iron (age-related iron) deposition physiologically accumulated with aging, which is a background component, with respect to an iron (amyloid iron) phase distribution of AP to be detected, a chain line g33 is a phase distribution of iron accumulated in the AP, and a threshold g34 is a phase threshold. Each white square (□) is measured data. The threshold g34 represents a phase value at an intersection of a distribution of the chain line g31 and a distribution of the chain line g33, and serves as a threshold at which the iron distribution in AP is dominant at a phase value lower than the intersection. Further, as illustrated in FIG. 2, the entire phase distribution is almost occupied by a negative region having a phase value of 0 or less, and further, as illustrated in FIG. 2, the phase distribution of AP is biased to a negative side (a left side) of the entire distribution. The two components model assumes that the phase distribution in the ROI is a sum of a phase distribution of iron corresponding to the background component and a phase distribution of iron accumulated in the AP.

First, an outline of a phase difference enhanced (PADRE) imaging method will be described. PADRE is a post-processing technique based on a related susceptibility weighted image (SWI), and selects and enhances a phase corresponding to a tissue to be enhanced, thereby improving a visualization ability of a target tissue. By using PADRE, a contrast of a target tissue such as a tissue, a blood vessel, or amyloid β in an MRI head image can be enhanced (see PTL 1).

Next, AP-PADRE used in the present embodiment will be described.

AP-PADRE is an image in which an amyloid plaque is enhanced. AP-PADRE is an image reconstruction method capable of visualizing accumulation of the amyloid β by selecting a phase difference specific to iron to be polymerized with an amyloid β protein, which is one of factors of Alzheimer's disease, and enhancing a contrast thereof. The iron present in a cerebral cortex is classified into physiological iron including the age-related iron and non-physiological iron including amyloid-related iron. AP-PADRE visualizes amyloid β-bound iron in an enhanced manner due to a difference in the phase difference thereof.

In a visual evaluation using such AP-PADRE, a significant difference has been observed in a visual evaluation between an Alzheimer's dementia patient and a control group in a low signal intensity distribution in the cerebral cortex. In the visual evaluation using AP-PADRE, it has been reported that the low signal intensity distribution in the superior temporal gyrus is positively correlated with MMSE in the Alzheimer's dementia patients (see NPL 1). This evaluation is a clinical evaluation, and actual amyloid β is not evaluated. PiB-PET is an imaging technique capable of visualizing amyloid β accumulation in the brain. As results of visual evaluations of AP-PADRE and PiB-PET of an Alzheimer's dementia patient, a mild cognitive impairment patient, a healthy person, a non-Alzheimer's dementia patient, and the like, it is difficult to distinguish between a PiB-positive case and a PiB-negative case only with a simple low signal intensity distribution in the cortex in the AP-PADRE image. A patient with amyloid β accumulation in the brain is referred to as "Alzheimer's disease", and a patient with a symptom of dementia caused by Alzheimer's disease is referred to as "Alzheimer's dementia".

It is considered that one of reasons for a poor contrast inside cerebral parenchyma in the AP-PADRE image, which is considered to be a cause of a problem of a clinical diagnosis using the AP-PADRE image, is that countless fine blood vessel structures running near the cerebral cortex, which is a region of interest, are visualized with significant low signal intensities on the AP-PADRE image. Further, in the AP-PADRE image, a patchy low signal intensity structure is observed in the cortex, but it is not clear which one of the patchy structure and a signal intensity value of the cortex itself serving as a background reflects the amyloid β deposition. Therefore, with respect to these, in the present embodiment, removal of the blood vessel structure that hinders a quantitative evaluation, separation of the patchy structure and the diffuse component in the cortex, and the like are performed in the process of image processing.

(Extraction and Removal of Blood Vessel Structure)

Next, processing of removing the blood vessel structure that hinders the quantitative evaluation will be described with reference to FIG. 3 and FIG. 4.

Figure 3:
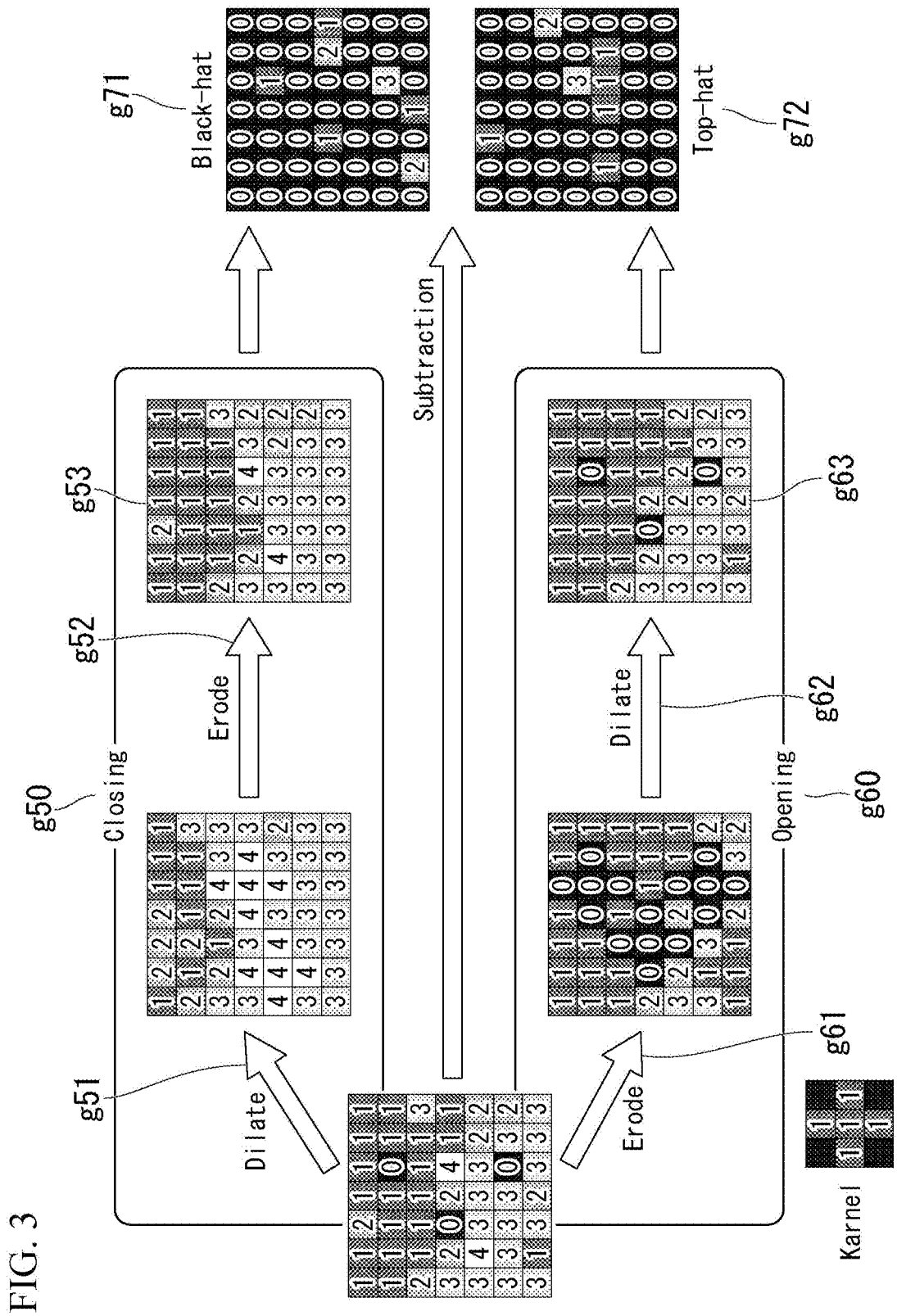
FIG. 3 is a diagram illustrating a morphological operation.

FIG. 3 is a diagram illustrating a morphological operation. FIG. 4 is a diagram illustrating an example of a blood vessel structure extraction processing according to the present embodiment. In the present embodiment, a linear structure of the blood vessel is extracted by, for example, the morphological operation. As illustrated in FIG. 3, in morphological transformation, image processing such as "dilation" and "erosion" is performed on a grayscale image. In the morphological transformation, an input image and a structural element (kernel) are given as inputs. As basic morphological 1 processing, opening processing g50 and closing processing g60 combining two processing of erosion (g52, g61) and dilation (g51, g62) are performed. Further, in the morphological transformation, black-hat transformation processing g71 for obtaining a difference between the input image g61 and an image g53 subjected to the closing processing, and top-hat transformation processing g72 for obtaining a difference between the input image g61 and an image g63 subjected to the opening processing are performed. As will be described later, as for the kernel, a linear kernel is used for removing a punctate component, and a planar kernel is used for removing a linear component. Further, a value of each pixel illustrated in FIG. 3 is an example, and the value is not limited thereto. The separation unit 18 uses the erosion, the dilation, the closing, and the black-hat described with reference to FIG. 3.

Figure 4:
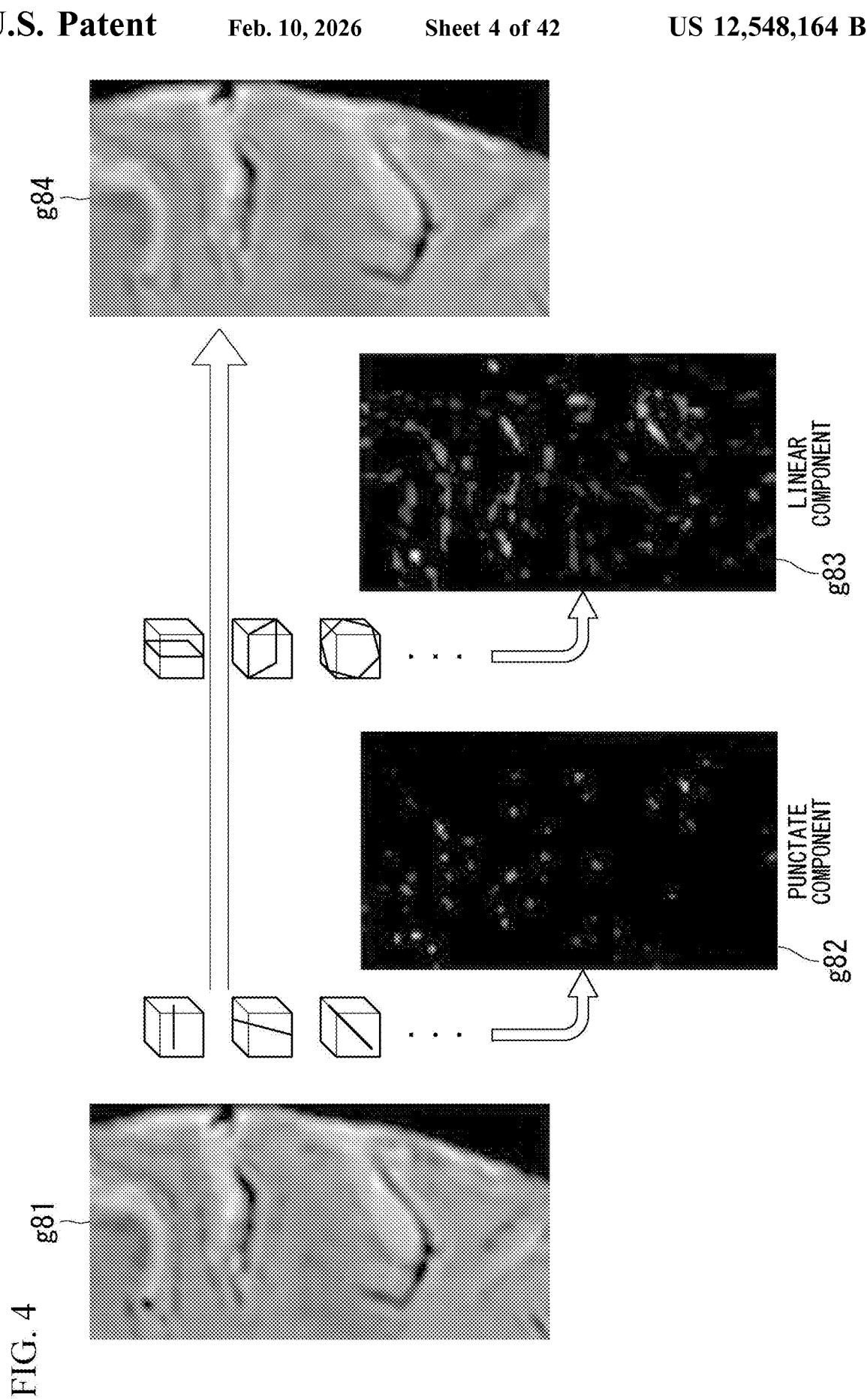
FIG. 4 is a diagram illustrating an example of blood vessel structure extraction processing according to the embodiment.

The image processing device 1 removes noise in a background of the input image or fills fine black dots included in an object by the processing in FIG. 3, and as illustrated in FIG. 4, extracts a punctate component g82 from an input image g81 using the linear kernel and extracts a linear component g83 using the planar kernel, thereby extracting a linear structure g84.

Next, processing of creating the blood vessel mask image by the morphological operation will be described with reference to FIG. 5 to FIG. 7.

Figure 5:
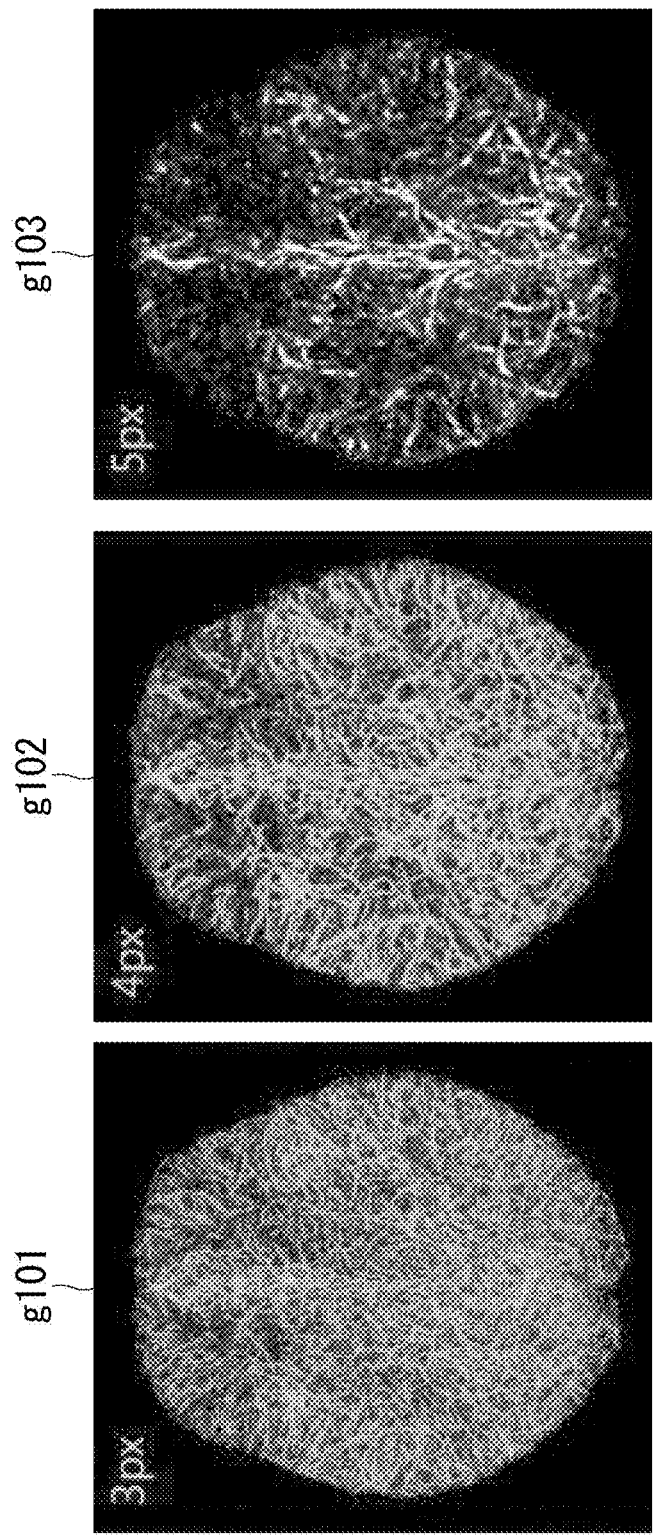
FIG. 5 is a diagram illustrating an example of extraction for each blood vessel diameter.

FIG. 5 is a diagram illustrating an example of extraction for each blood vessel diameter. An image g101 is an image obtained by operation with a 3-pixel width, an image g102 is an image obtained by operation with a 4-pixel width, and an image g103 is an image obtained by operation with a 5-pixel width. In this way, by changing the pixel width used for the operation, the blood vessel image to be removed can be extracted and removed from the image according to a thickness of the blood vessel. The low signal intensity indicates a low signal intensity in the enhanced image (black in the image). The high signal intensity indicates a high signal intensity in the enhanced image (white in the image). The pixel width illustrated in FIG. 5 is an example, and the pixel width is not limited thereto, and may be a 6-pixel width or more.

Figure 6:
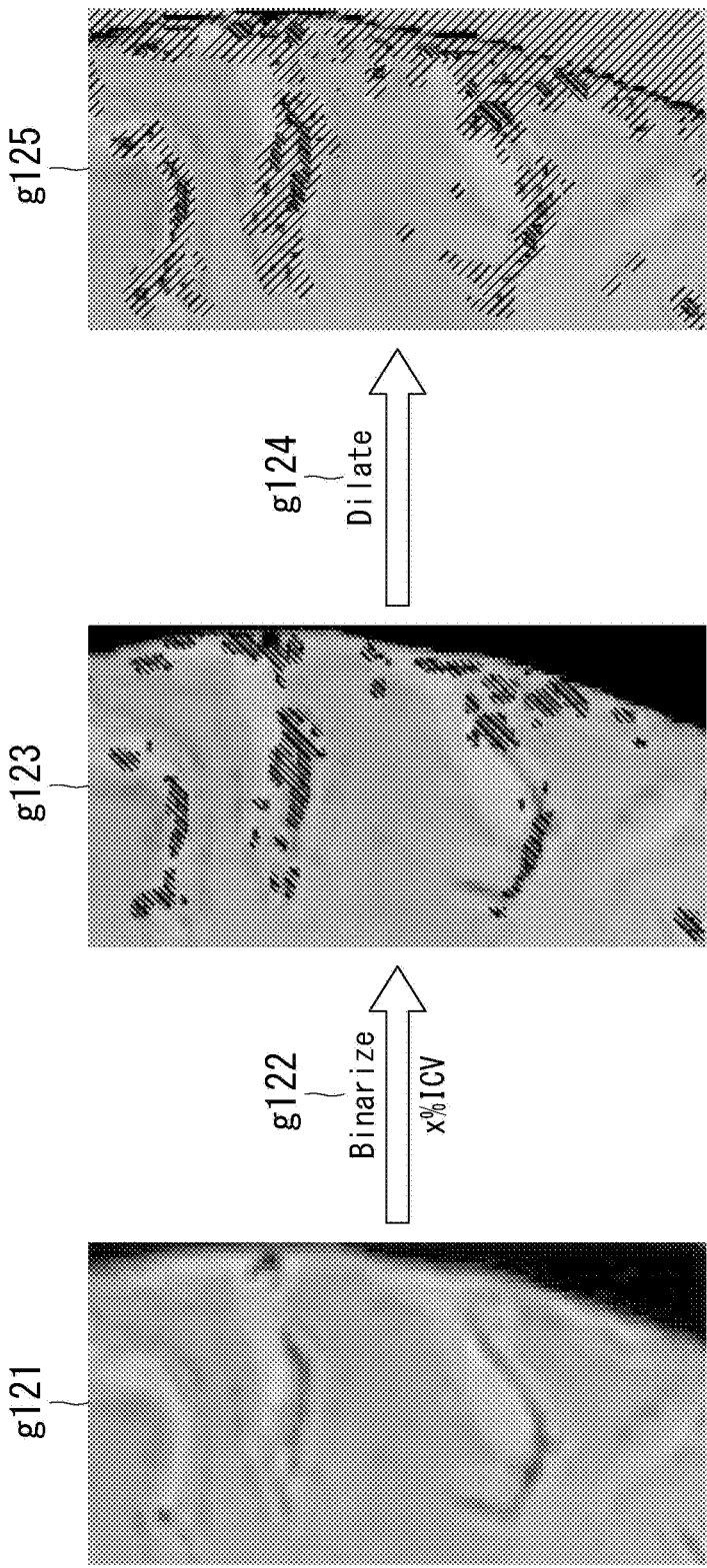
FIG. 6 is a diagram illustrating an example of blood vessel mask image creation processing according to the embodiment.

FIG. 6 is a diagram illustrating an example of the blood vessel mask image creation processing according to the present embodiment. As illustrated in FIG. 6, the image processing device 1 first performs binarization processing g122 on an input image g121. A threshold used for the binarization processing is set according to a volume ratio to an intracranial volume. A volume ratio of an arteriovenous portion in a cranium is approximately 2% of the intracranial volume, and the threshold is set based on this volume ratio. In the present embodiment, the mask processing unit 17 further creates a blood vessel mask image including a margin and removes the blood vessel image.

Figure 7:
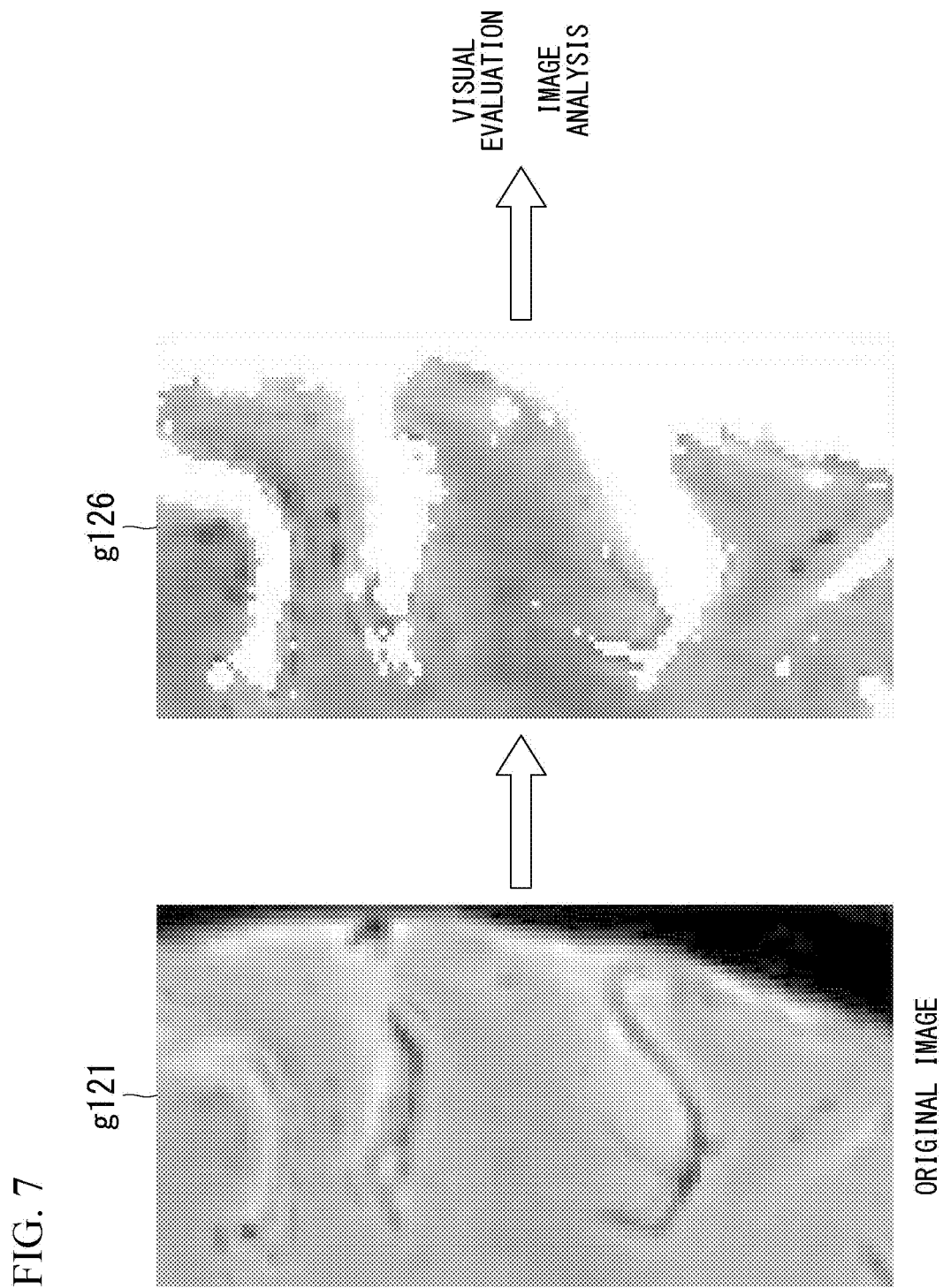
FIG. 7 illustrates examples of an image before application of the blood vessel mask image, and an image obtained by removing a blood vessel structure from an AP-PADRE image using a blood vessel mask and further removing an extraparenchymal component using a brain parenchymal mask created from MPRAGE according to the embodiment.

Next, the image processing device 1 performs dilation processing g124 on an image g123 subjected to binarization processing (to obtain g125), and removes the blood vessel structure from the MRI image using a blood vessel mask image as illustrated in FIG. 7. FIG. 7 is a diagram illustrating the image g121 before application of the blood vessel mask image, and an image g126 obtained by removing the blood vessel structure from the AP-PADRE image using a blood vessel mask and further removing an extraparenchymal component using a brain parenchymal mask created from MPRAGE according to the present embodiment. In the visual evaluation, the image g126 which also includes a gray matter and a white matter is used. In quantitative analysis, only a gray matter portion is used for the ROI. As illustrated in FIG. 7, by removing the blood vessel structure from the MRI image, it is possible to visually evaluate the low signal intensity structure or the like of the image in the cortex and to analyze the image.

(Blood Vessel Mask Creation Procedure)

Next, an example of a blood vessel mask creation procedure will be described.

Figure 8:
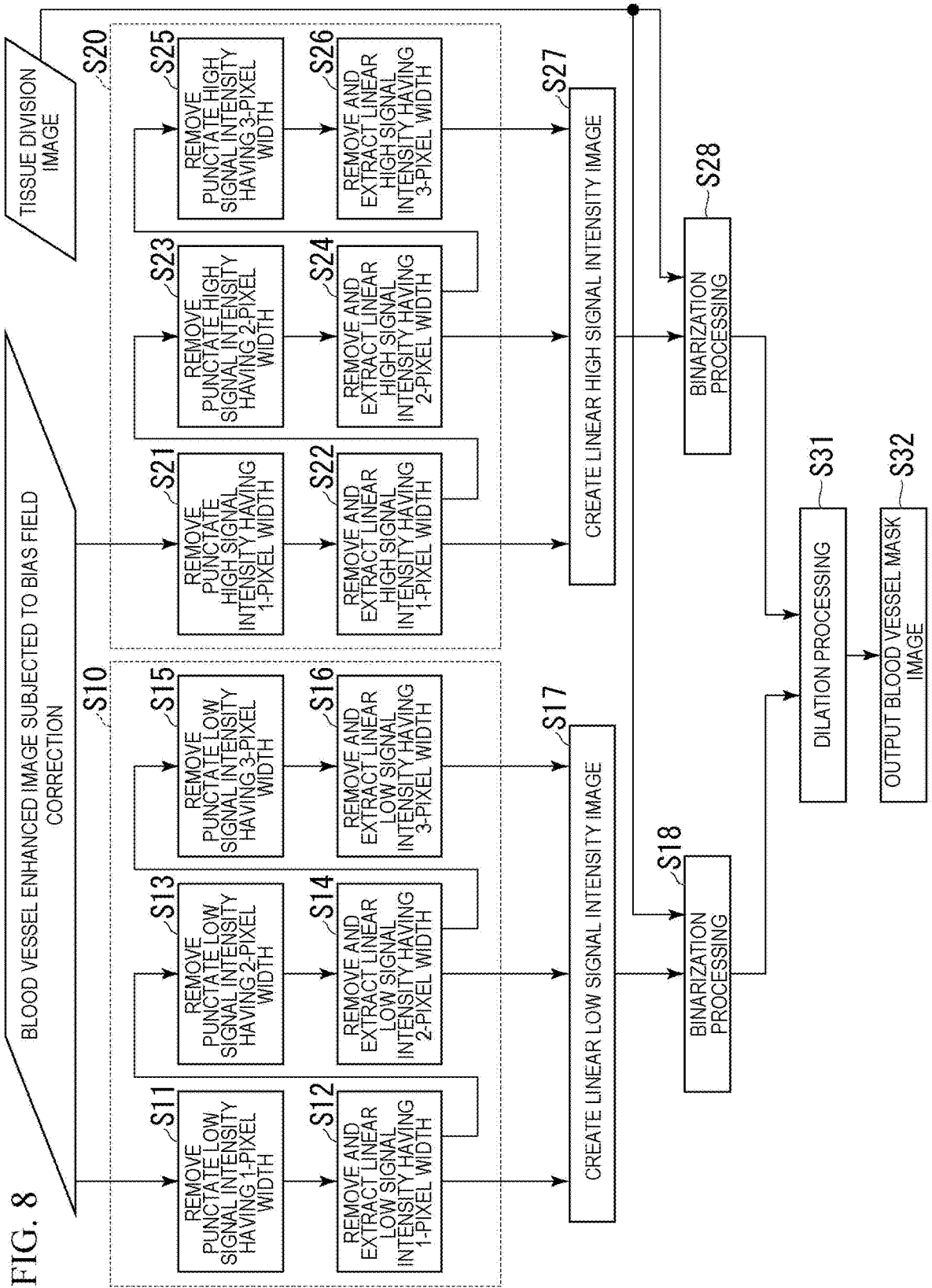
FIG. 8 is a flowchart of a blood vessel mask image creation procedure according to the embodiment.

FIG. 8 is a flowchart of the blood vessel mask image creation procedure according to the present embodiment.

(Step S11) The blood vessel mask creation unit 14 removes a punctate low signal intensity having a 1-pixel width from the blood vessel enhanced image subjected to bias field correction. A processing method for removing a low signal intensity will be described with reference to FIG. 9.

(Step S12) The blood vessel mask creation unit 14 removes a linear low signal intensity having a 1-pixel width and extracts the linear low signal intensity having a 1-pixel width from the image from which the punctate low signal intensity having a 1-pixel width has been removed. A processing method for removing and extracting a linear low signal intensity will be described with reference to FIG. 10.

(Step S13) The blood vessel mask creation unit 14 removes a punctate low signal intensity having a 2-pixel width from the image in which the punctate low signal intensity having a 1-pixel width and the linear low signal intensity having a 1-pixel width have been removed.

(Step S14) The blood vessel mask creation unit 14 removes a linear low signal intensity having a 2-pixel width and extracts the linear low signal intensity having a 2-pixel width from the image from which the punctate low signal intensity having a 1-pixel width, the linear low signal intensity having a 1-pixel width, and the punctate low signal intensity having a 2-pixel width have been removed.

(Step S15) The blood vessel mask creation unit 14 removes a punctate low signal intensity having a 3-pixel width from the image from which the punctate low signal intensity having a 1-pixel width, the linear low signal intensity having a 1-pixel width, the punctate low signal intensity having a 2-pixel width, and the linear low signal intensity having a 2-pixel width have been removed.

(Step S16) The blood vessel mask creation unit 14 removes a linear low signal intensity having a 3-pixel width and extracts the linear low signal intensity having a 3-pixel width from the image from which the punctate low signal intensity having a 1-pixel width, the linear low signal intensity having a 1-pixel width, the punctate low signal intensity having a 2-pixel width, the linear low signal intensity having a 2-pixel width, and the punctate low signal intensity having a 3-pixel width have been removed.

(Step S17) The blood vessel mask creation unit 14 creates a linear low signal intensity image using an extracted linear low signal intensity extraction image having a 1-pixel width, an extracted linear low signal intensity extraction image having a 2-pixel width, and an extracted linear low signal intensity extraction image having a 3-pixel width. By the processing in step S11 to step S17, the blood vessel mask creation unit 14 mainly extracts a low signal intensity component as a vein component.

(Step S18) The blood vessel mask creation unit 14 performs binarization processing on the linear low signal intensity image. A threshold used for the binarization processing is set according to the volume ratio to the intracranial volume. After the processing, the mask processing unit 17 removes a blood vessel component from the AP-PADRE image using the blood vessel mask image.

(Step S21 to step S26) The blood vessel mask creation unit 14 removes a punctate high signal intensity having a 1-pixel width from the blood vessel enhanced image subjected to bias field correction. Hereinafter, the blood vessel mask creation unit 14 performs processing on the "high signal intensity" instead of the "low signal intensity" in step S11 to step S16.

(Step S27) The blood vessel mask creation unit 14 creates a linear high signal intensity image using an extracted linear high signal intensity extraction image having a 1-pixel width, an extracted linear high signal intensity extraction image having a 2-pixel width, and an extracted linear high signal intensity extraction image having a 3-pixel width. A reason for processing a high signal intensity component is that when creating a blood vessel mask image, an artery is also derived together, and a high signal intensity is output to the artery having a flow. When determining from the image, this component also influences interpretation. Therefore, by the processing in steps S21 to step S27, the blood vessel mask creation unit 14 removes the high signal intensity component as the artery component.

(Step S28) The blood vessel mask creation unit 14 performs binarization processing on the linear high signal intensity image. After the processing, the mask processing unit 27 performs mask processing to extract information on the region of interest.

(Step S31) The blood vessel mask creation unit 14 performs dilation processing on the linear low signal intensity image and the linear high signal intensity image subjected to the binarization processing.

(Step S32) The blood vessel mask creation unit 14 generates and outputs a blood vessel mask image based on the images subjected to the dilation processing.

In FIG. 8, the blood vessel mask creation unit 14 may perform the processing in step S10 (S11 to S16) and the processing in step S20 (S21 to S26) simultaneously, in parallel, or in a time-division manner. Further, the blood vessel mask creation unit 14 may perform the processing in step S17 and step S18 and the processing in step S27 and step S28 simultaneously, in parallel, or in the time-division manner.

In the example illustrated in FIG. 8, an example in which the pixel width is 1 to 3 and the removal processing is performed in three stages is illustrated, but the invention is not limited thereto. The pixel width and the number of stages of the removal processing depend on a decomposition ability for the original image, and the removal processing may be performed with any pixel width. In this case, processing of removing the punctate low signal intensity having an n-pixel width and removing and extracting the linear low signal intensity having an n-pixel width may be performed n times, and processing of removing the punctate high signal intensity having an n-pixel width and removing and extracting the linear high signal intensity having an n-pixel width may be performed n times.

(Processing Method for Removing Punctate Signal Intensity)

Next, a processing method for removing a punctate signal intensity will be described. As a representative, a processing procedure for removing a punctate low signal intensity having a 1-pixel width will be described.

Figure 9:
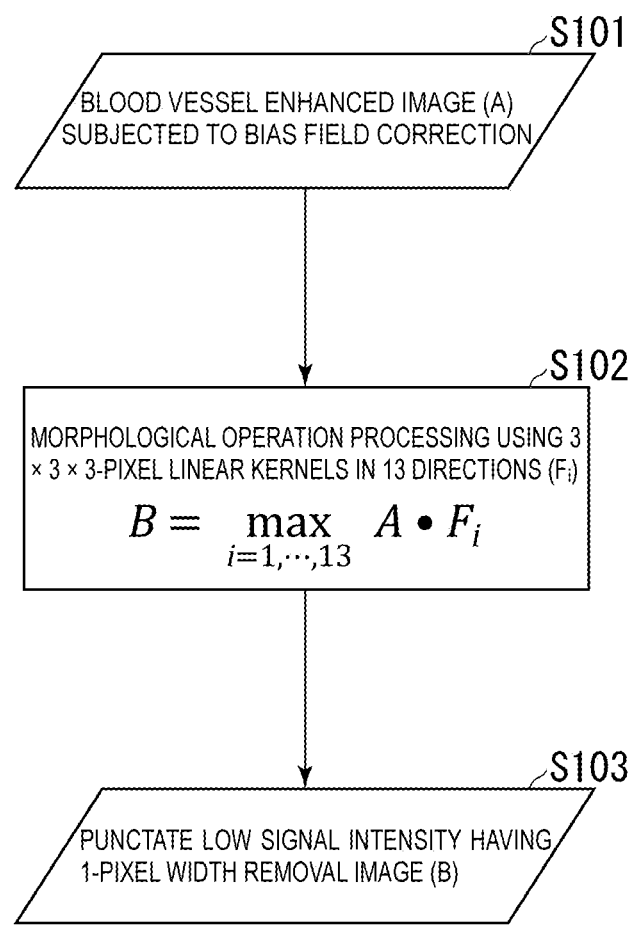
FIG. 9 is a flowchart of a processing procedure for removing a punctate low signal intensity having a 1-pixel width according to the embodiment.

FIG. 9 is a flowchart of the processing procedure for removing the punctate low signal intensity having a 1-pixel width according to the present embodiment.

(Step S101) The blood vessel mask creation unit 14 acquires a blood vessel enhanced image (A) subjected to bias field correction.

(Step S102) The blood vessel mask creation unit 14 creates, from the blood vessel enhanced image (A), a removal image (B) from which the punctate low signal intensity having a 1-pixel width has been removed by morphological operation processing represented by the following Equation (1) using 3×3×3-pixel linear kernels in 13 directions (Fi1) for removing the punctate low signal intensity. The 3×3×3-pixel linear kernels in 13 directions will be described later.

[Math. 1]

$$B = \max_{i=1,\ldots,13} A \cdot F_{i1} \quad (1)$$

In Equation (1), an operator "•" is closing processing.

(Step S103) The blood vessel mask creation unit 14 outputs the created removal image (B) from which the punctate low signal intensity having a 1-pixel width has been removed.

The blood vessel mask creation unit 14 performs an operation for the image from which the punctate low signal intensity having a 2-pixel width has been removed, using Fi2 instead of Fi1 in Equation (1) as a linear structure unit.

The blood vessel mask creation unit 14 performs an operation for the image from which the punctate low signal intensity having a 3-pixel width has been removed, using Fi3 instead of Fi1 in Equation (1) as the linear structure unit.

Further, the blood vessel mask creation unit 14 performs an operation for the image from which the punctate high signal intensity having a 1-pixel width has been removed, and creates a removal image (B) from which the linear low signal intensity having a 1-pixel width has been removed, by morphological operation processing represented by the following Equation (2) using 3×3×3-pixel linear kernels in 13 directions (Fi1) for removing the high signal intensity.

[Math. 2]

$$B = \min_{i=1,\ldots,13} A \circ F_{i1} \quad (2)$$

In Equation (2), the operator "∘" is opening processing.

The blood vessel mask creation unit 14 performs an operation for the image from which the punctate high signal intensity having a 2-pixel width has been removed, using Fi2 instead of Fi1 in Equation (2) as a linear structure unit.

The blood vessel mask creation unit 14 performs an operation for the image from which the punctate high signal intensity having a 3-pixel width has been removed, using Fi3 instead of Fi1 in Equation (2) as the linear structure unit.

(Processing Method for Removing and Extracting Linear Signal Intensity)

Next, a processing method for removing and extracting a linear signal intensity will be described. As a representative, a processing procedure for removing and extracting a linear low signal intensity having a 1-pixel width will be described.

Figure 10:
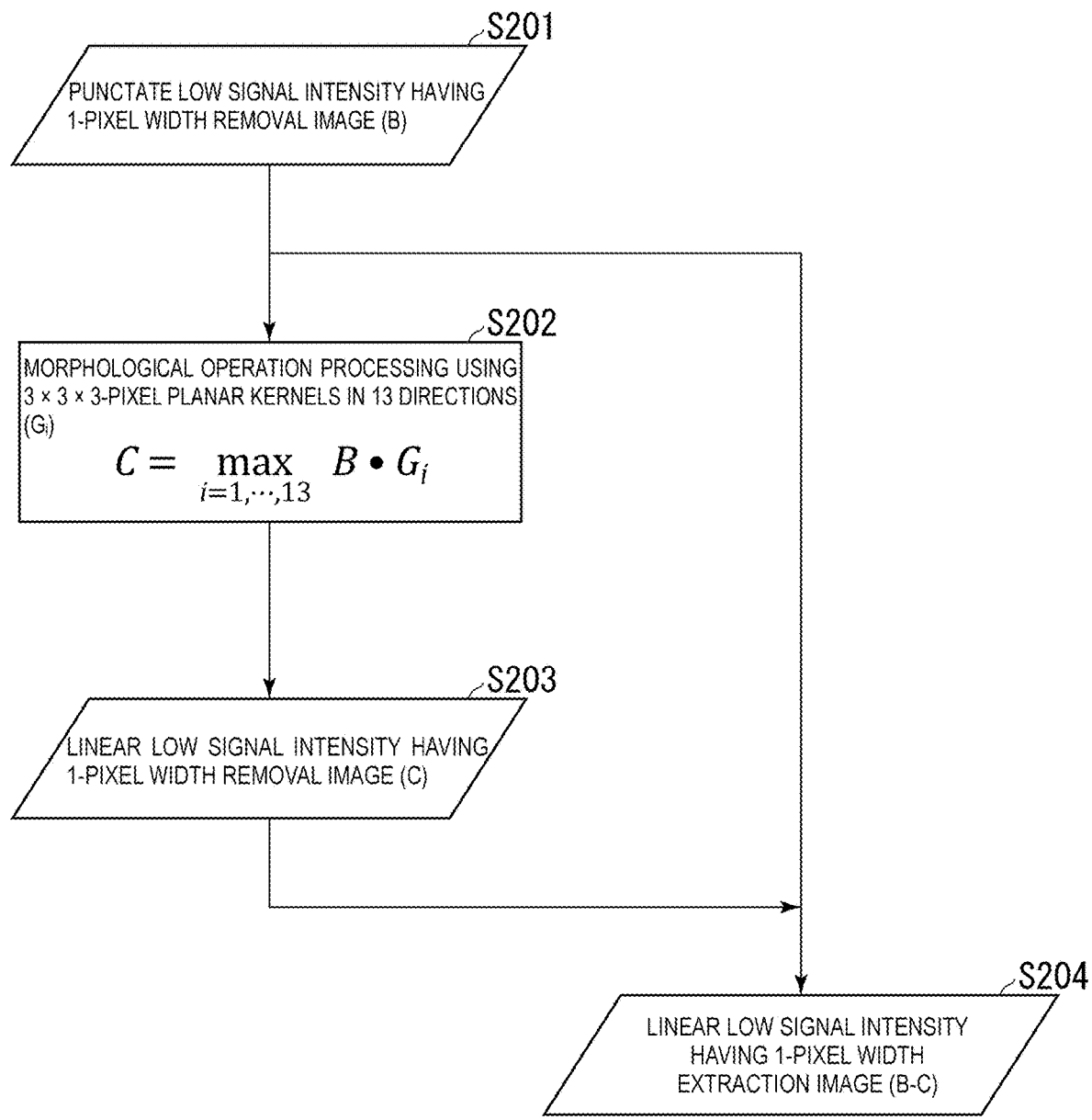
FIG. 10 is a flowchart of a processing procedure for removing a linear low signal intensity having a 1-pixel width according to the embodiment.

FIG. 10 is a flowchart of the processing procedure for removing the linear low signal intensity having a 1-pixel width according to the present embodiment.

(Step S201) The blood vessel mask creation unit 14 acquires a removal image (B) from which the punctate low signal intensity having a 1-pixel width has been removed.

(Step S202) The blood vessel mask creation unit 14 creates, from the removal image (B), a removal image (C) from which the linear low signal intensity having a 1-pixel width has been removed, by morphological operation processing represented by the following Equation (3) using 3×3×3-pixel planar kernels in 13 directions (Gi1) for removing the linear low signal intensity. The 3×3×3-pixel planar kernels in 13 directions will be described later.

[Math. 3]
$$C = \max_{i=1,\ldots,13} B \cdot G_{i1} \quad (3)$$

(Step S203) The blood vessel mask creation unit 14 outputs the created removal image (C) from which the linear low signal intensity having a 1-pixel width has been removed.

(Step S204) The blood vessel mask creation unit 14 subtracts the removal image (C) from the removal image (B) to extract the linear low signal intensity having a 1-pixel width, and outputs an extraction image (B-C) after extraction.

The blood vessel mask creation unit 14 performs an operation for the image from which the linear low signal intensity having a 2-pixel width has been removed, using Gi2 instead of Gi1 in Equation (3) as a planar structure unit.

The blood vessel mask creation unit 14 performs an operation for the image from which the linear low signal intensity having a 3-pixel width has been removed, using Gi2 instead of Gi1 in Equation (3) as the planar structure unit.

Further, the blood vessel mask creation unit 14 performs an operation for the image from which the linear high signal intensity having a 1-pixel width has been removed, and creates a removal image (C) from which the planar low signal intensity having a 1-pixel width has been removed, by morphological operation processing represented by the following Equation (4) using the 3×3×3-pixel planar kernels in 13 directions (Gi1) for removing the high signal intensity. The blood vessel mask creation unit 14 subtracts the removal image (B) from the removal image (C) to extract the linear low signal intensity having a 1-pixel width, and outputs the extraction image (B-C) after extraction.

[Math. 4]
$$C = \min_{i=1,\ldots,13} B \circ G_{i1} \quad (4)$$

The blood vessel mask creation unit 14 performs an operation for the image from which the linear high signal intensity having a 2-pixel width has been removed, using Gi2 instead of Gi1 in Equation (4) as the planar structure unit.

The blood vessel mask creation unit 14 performs an operation for the image from which the linear high signal intensity having a 3-pixel width has been removed, using Gi3 instead of Gi1 in Equation (4) as the planar structure unit.

(3×3×3 Kernels in 13 Directions)

Next, the 3×3×3-pixel kernels in 13 directions will be described.

Figure 11:
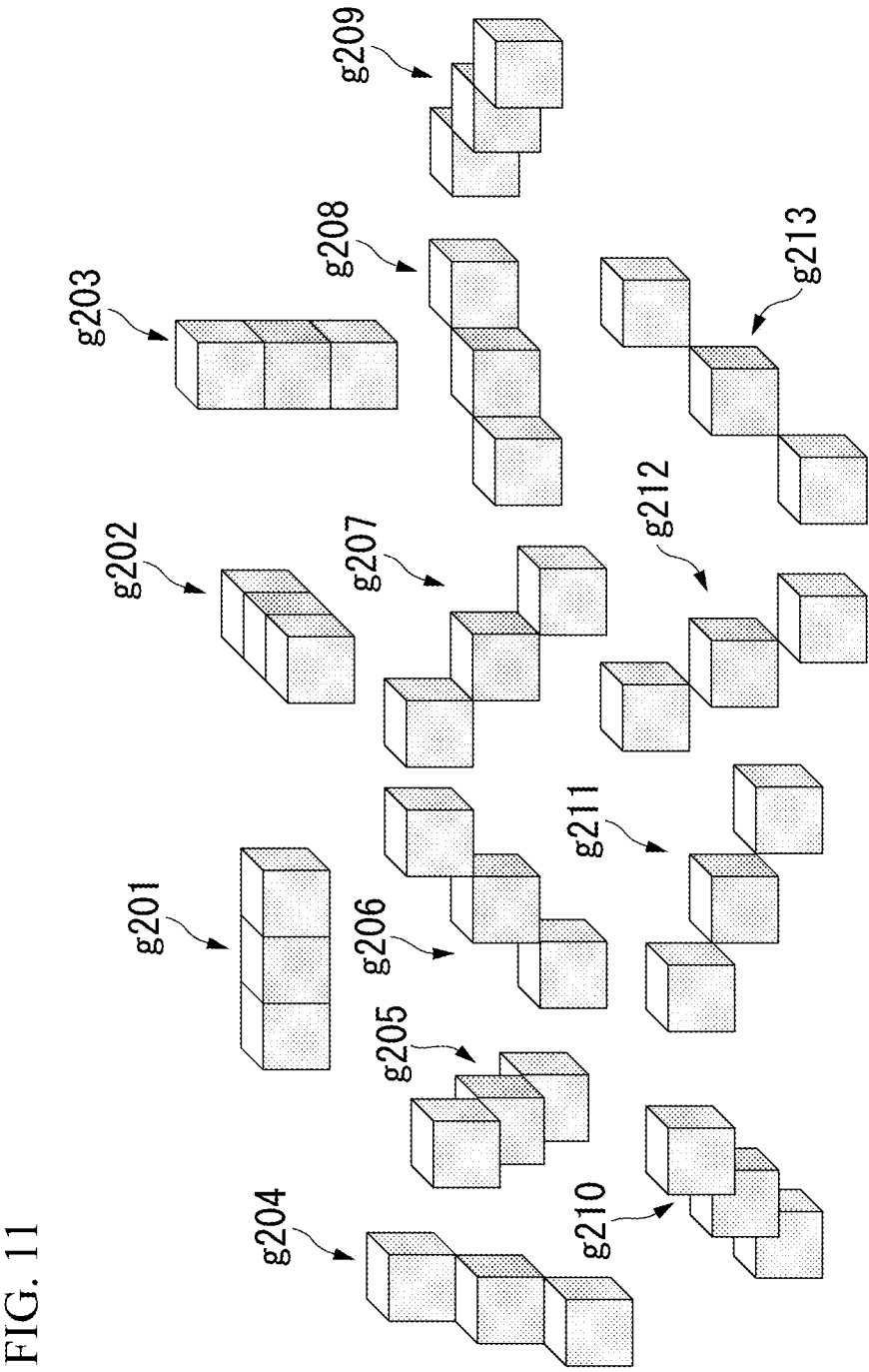
FIG. 11 is a diagram illustrating 3×3×3-pixel linear kernels in 13 directions.

FIG. 11 is a diagram illustrating the 3×3×3-pixel linear kernels in 13 directions. As illustrated in FIG. 11, each of linear kernels g201 to g213 in 13 directions includes three adjacent linear pixels in a space having 3×3×3 pixels. In the present embodiment, the punctate component is removed by such linear kernels.

Figure 12:
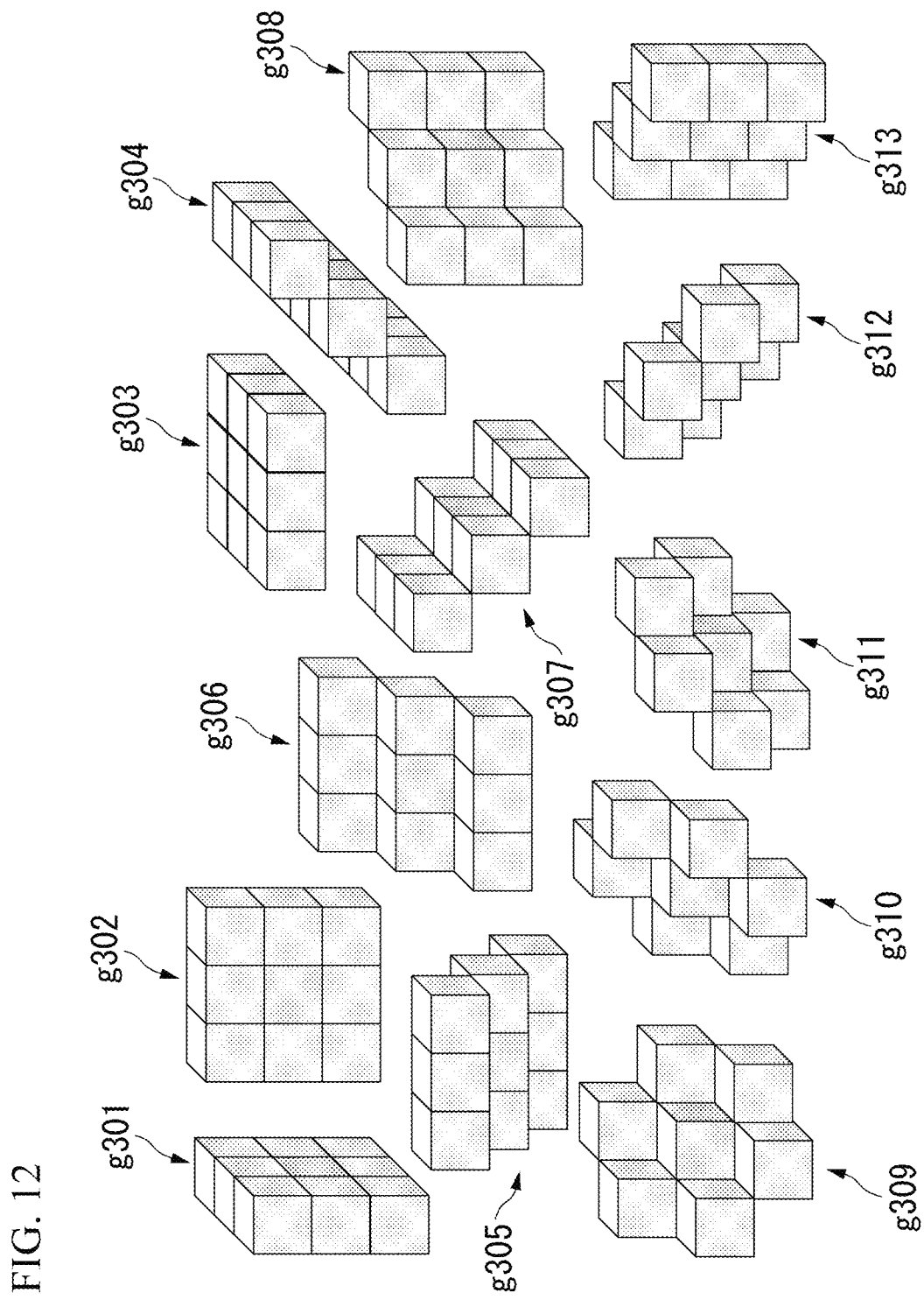
FIG. 12 is a diagram illustrating 3×3×3-pixel planar kernels in 13 directions.

FIG. 12 is a diagram illustrating the 3×3×3-pixel planar kernels in 13 directions. As illustrated in FIG. 12, each of planar kernels g301 to g313 in 13 directions includes nine adjacent planar pixels in a space having 3×3×3 pixels. In the present embodiment, the processing using a linear structural unit and a planar structural unit is performed in the order in FIG. 8 to FIG. 10, and thus the punctate component and the linear component can be classified.

In the example described above, an example is illustrated in which the local low signal s intensity component is removed and the diffuse component is extracted from the image obtained by removing the blood vessel structure from the AP-PADRE image using the blood vessel mask image, but the invention is not limited to this. For example, the image processing device 1 may remove the local low signal intensity component and extract the diffuse component from the AP-PADRE image.

<Verification>

Hereinafter, examples of verification results of a visual evaluation by an image created according to the present embodiment described above and a visual evaluation by an image created by a technique in the related art will be described.

(First Verification)

First, a result of a doctor visually evaluating an image obtained by subjecting an MRI image layer to PADRE processing and removing a blood vessel structure using a blood vessel mask image, and comparing a positive group and a negative group of Pittsburgh compound-B-positron emission tomography (PiB-PET) will be described with reference to FIG. 13 and FIG. 14.

Figure 13:
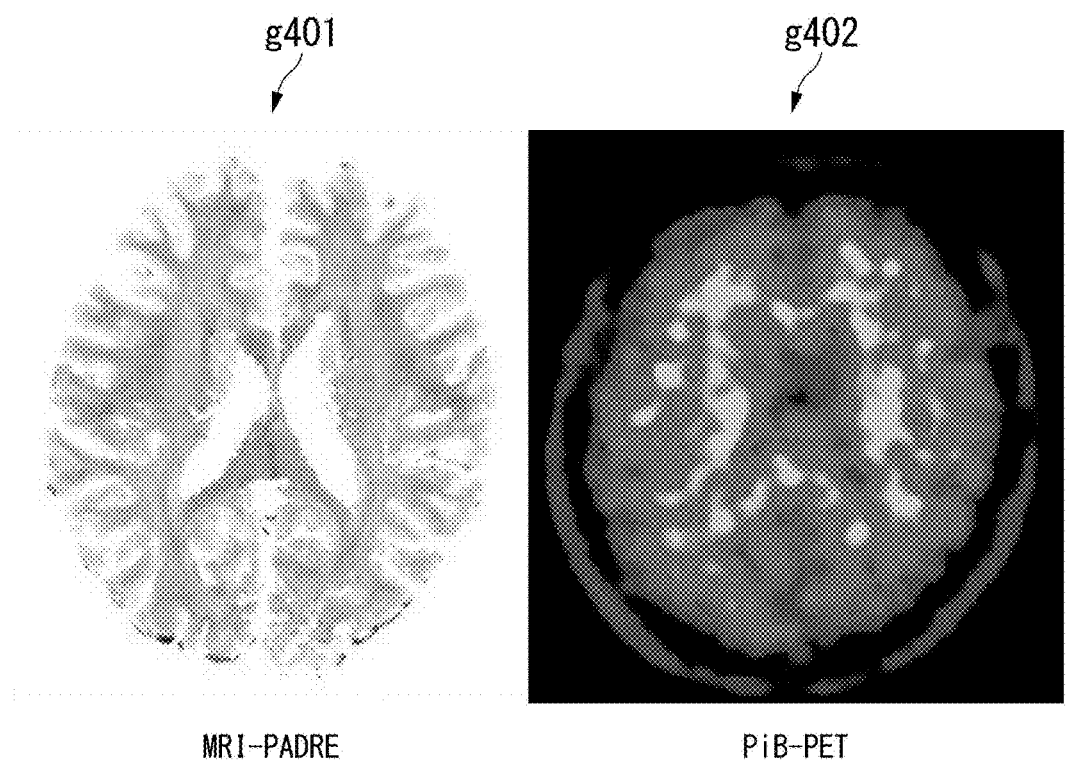
FIG. 13 illustrates a PADRE image of a PiB-negative group from which a blood vessel structure and a brain extraparenchymal component have been removed, and an example of an image regarding PiB-PET used for comparison in a comparative example.
Figure 14:
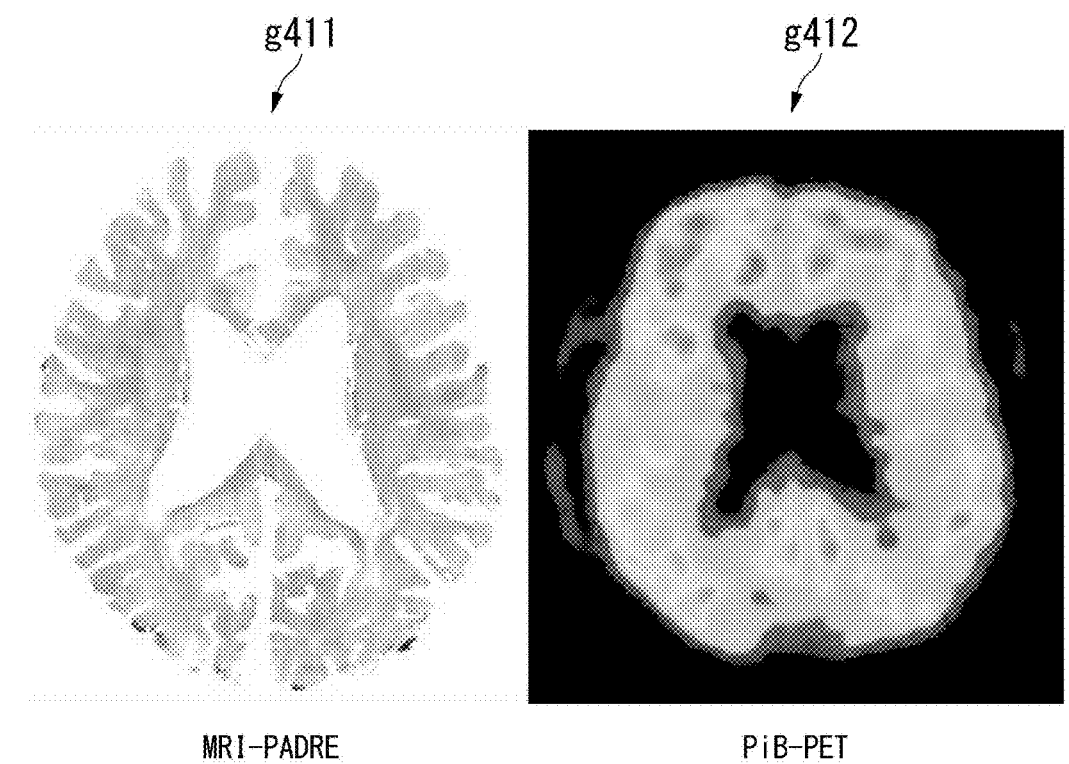
FIG. 14 illustrates a PADRE image of a PiB-positive group from which a blood vessel structure and a brain extraparenchymal component have been removed and an example of an image regarding PiB-PET used for comparison in the comparative example.

FIG. 13 is a diagram illustrating a PADRE image (MRI-PADRE image) from which a blood vessel structure and a brain extraparenchymal component of the PiB-negative group (normal control) in a comparative example have been removed, and an example of an image regarding PiB-PET used for comparison. FIG. 14 is a PADRE image (MRI-PADRE image) from which a blood vessel structure and a brain extraparenchymal component of a PiB-positive group (Alzheimer's disease (AD)) in the comparative example have been removed, and an example of an image regarding PiB-PET used for comparison. An image g401 and an image g411 are MRI PADRE images after the blood vessel image and the brain extraparenchymal component are removed by the above-described method. An image g402 and an image g412 are PiB-PET images.

As a result of the doctor visually evaluating 11 examples of MRI-PADRE images of PiB-PET negative and positive cases in the comparative example, in a case in which the blood vessel portion and the brain extraparenchymal component are removed from the PADRE image, the evaluation is easier than that before the blood vessel portion is removed. However, in some cases, it is difficult to visually evaluate whether a group is a negative group or a positive group only by an image obtained by removing the blood vessel portion from the PADRE image.

(Second Verification)

Next, examples of the results of region of interest (ROI) analysis on signal intensities in the cortex using automated anatomical labeling ((AAL), see Reference Document 1) atlas will be described with reference to FIG. 15 to FIG. 18. In this verification, a PADRE signal intensity in each region of the brain is compared between the PiB-PET-positive group and the PiB-PET-negative group.

FIG. 15 illustrates an example of an AAL atlas image set on a standard brain coordinate and an example of an image in which ROI based on the AAL atlas is superimposed on the PADRE image. An image g451 is an example of an image based on the AAL atlas. An image g452 is an example of an image obtained by transforming an AAL atlas image set on the standard brain into an individual brain coordinate and then processing the individual brain coordinate with a blood vessel mask and a gray matter mask. It can be seen from FIG. 16 that signal intensities are distributed in the cortex portion.

Reference Document 1: N. Tzourio-Mazoyer, B. Landeau, al, "Automated Anatomical Labeling of Activations in SPM Using a Macroscopic Anatomical Parcellation of the MNI MRI Single-Subject Brain", NeuroImage, Volume 15, Issue 1, January 2002, Pages 273-289

Figure 16:
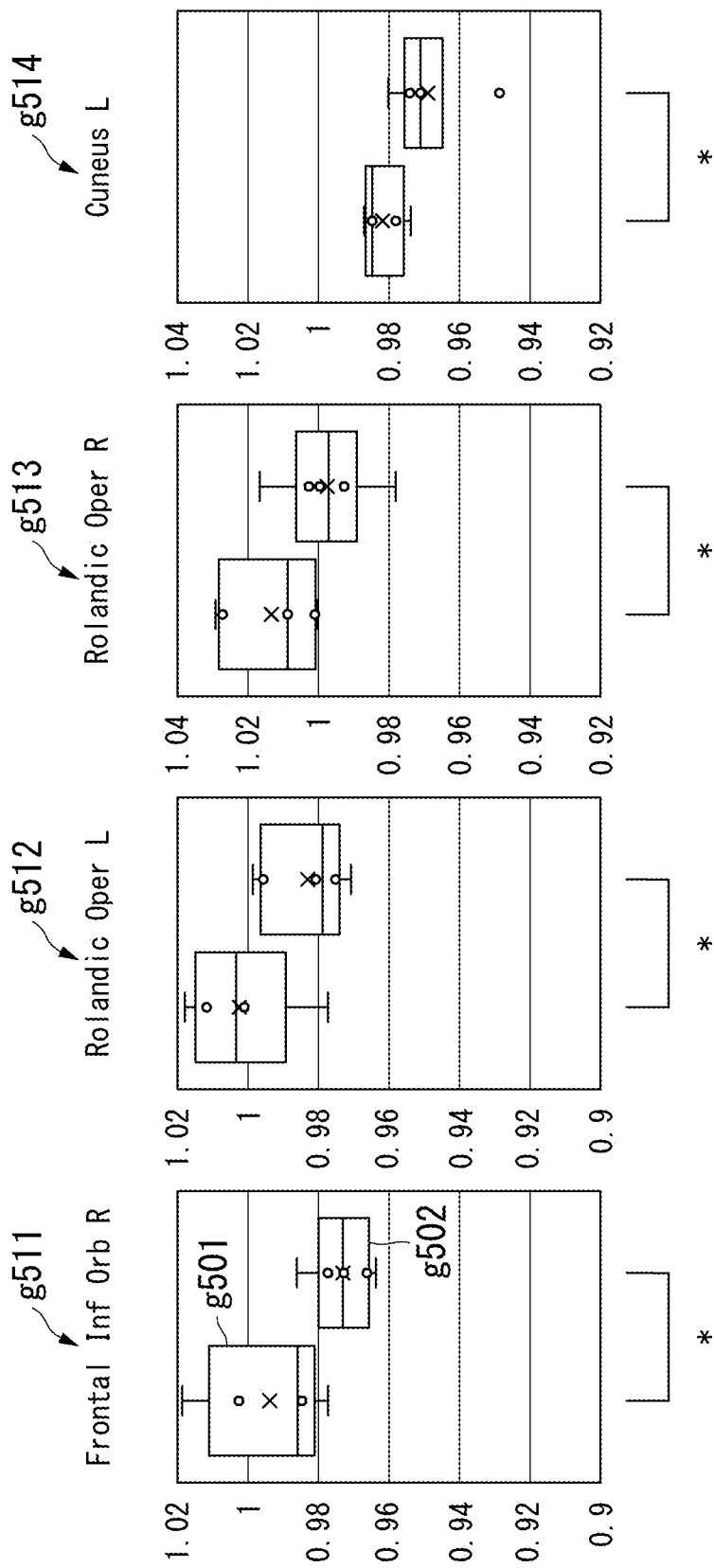
FIG. 16 is a diagram illustrating means of PADRE signal intensities normalized by a cerebellar mean in a cortex analyzed by ROI based on the AAL atlas for each of the PiB-positive group and the PiB-negative group.
Figure 17:
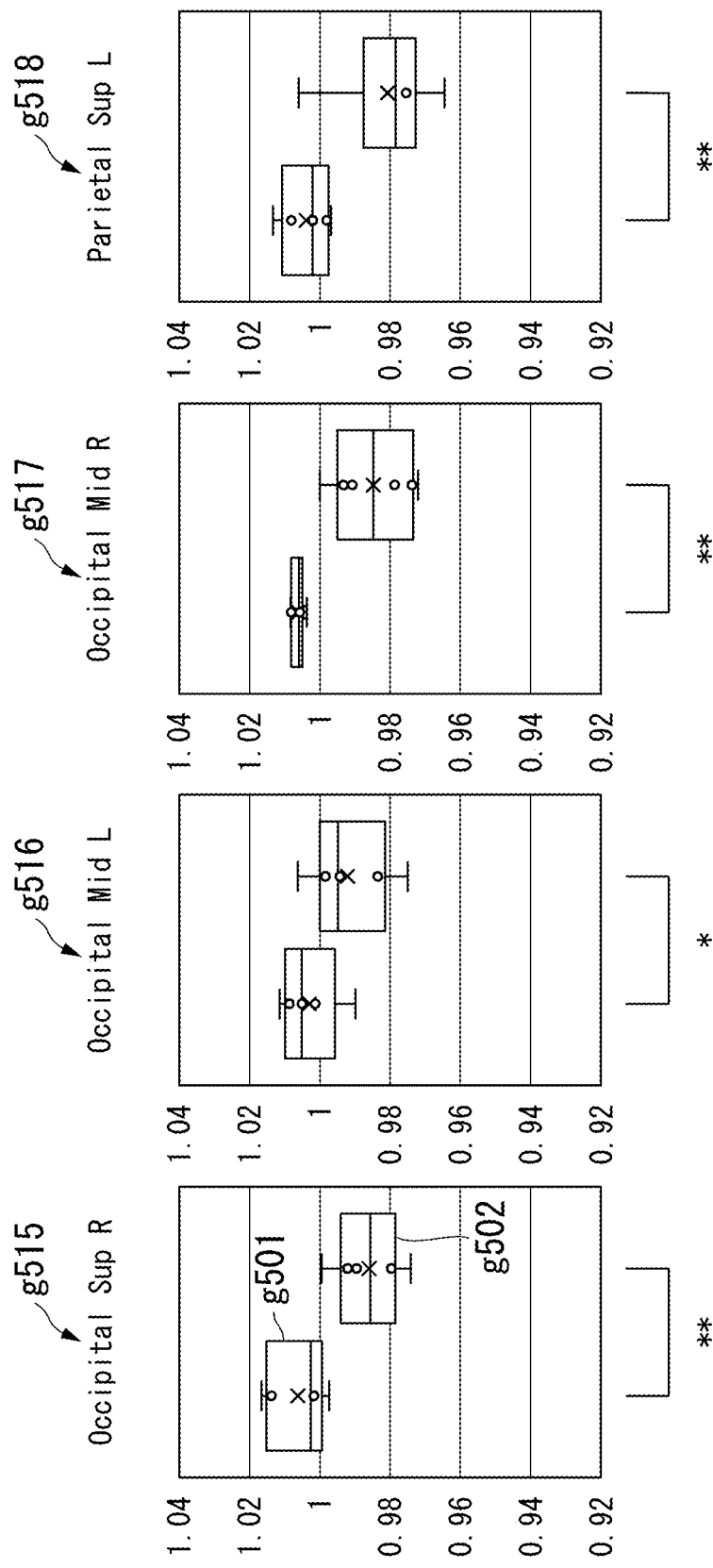
FIG. 17 is a diagram illustrating means of PADRE signal intensities normalized by the cerebellar mean in the cortex analyzed by ROI based on the AAL atlas for each of the PiB-positive group and the PiB-negative group.
Figure 18:
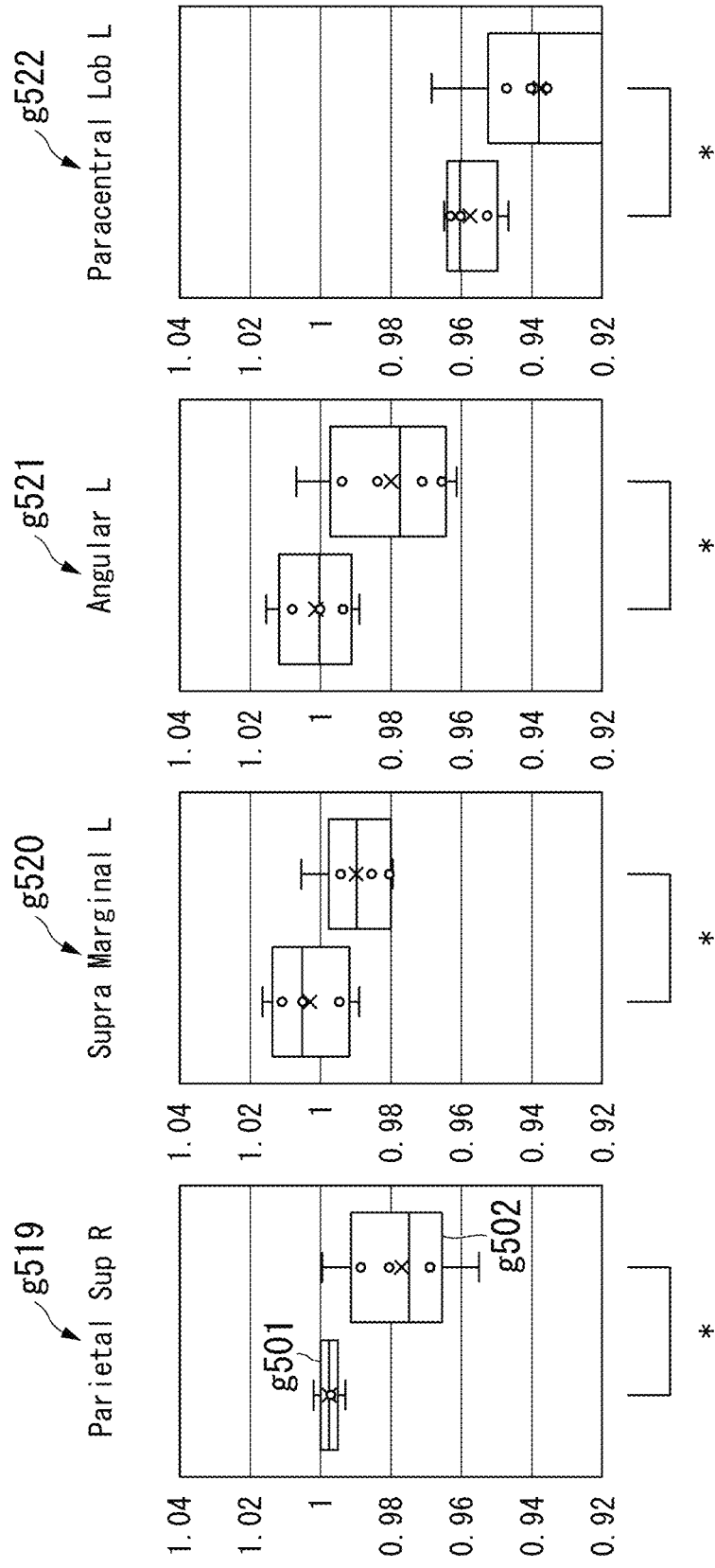
FIG. 18 is a diagram illustrating means of PADRE signal intensities normalized by the cerebellar mean in the cortex analyzed using ROI based on the AAL atlas for each of the PiB-positive group and the PiB-negative group.

FIG. 16 to FIG. 18 are diagrams illustrating means of PADRE signal intensities normalized by a cerebellar mean in a cortex analyzed by ROI based on the AAL atlas for each of the PiB-positive group and the PiB-negative group. In each graph g511 to g522 in FIG. 16 to FIG. 18, a left item g501 is a result for the negative group, and a right item g502 is a result for the positive group. Further, in each graph g511 to g522 in FIG. 16 to FIG. 18, a vertical axis represents a relative signal intensity value when a mean of the cerebral gray matter is 1.

The graph g511 is a result for an orbital portion of an inferior frontal lobe (right) (Frontal Inf Orb R). The graph g512 is a result for a rolandic operculum (left) (Rolonic Oper L). The graph g513 is a result for a rolandic operculum (right) (Rolonic Oper L). The graph g514 is a result for a cuneus (left) (Cuneus L).

The graph g515 is a result for a right superior occipital gyrus (Occipital Sup R). The graph g516 is a result for a left middle occipital gyrus (Occipital Mid L). The graph g517 is a result for a right middle occipital gyrus (Occipital Mid R). The graph g518 is a result for a superior parietal lobule (left) (Parietal Sup L).

The graph g519 is a result for a superior parietal lobule (right) (Parietal Sup R). The graph g520 is a result for a supramarginal gyrus (right) (Supra Marginal R). The graph g521 is a result for a right angular gyrus (Angular R). The graph g522 is a result for a paracentral lobule (left) (Paracentral Lob L).

In each graph g511 to g522 in FIG. 16 to FIG. 18, "*", "", and "*" are evaluations based on a P value, and the greater the number of asterisks, the more statistically significant the difference between the positive group and the negative group.

Figure 19:
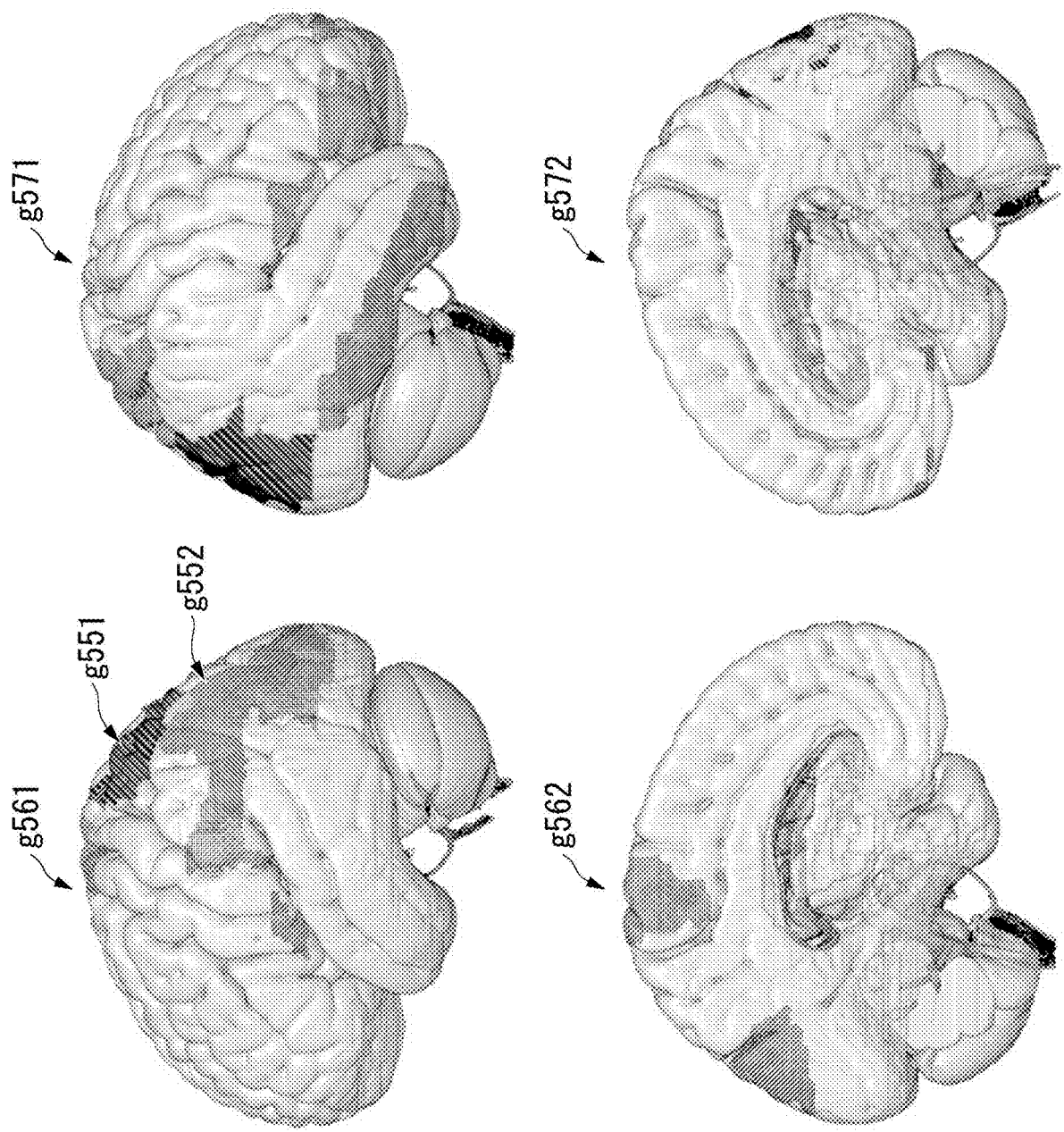
FIG. 19 illustrates diagrams obtained by mapping, onto a brain surface, regions in which there are statistically significant differences between the means of the PADRE signal intensities in the cortex analyzed by ROI based on the AAL atlas for each of the PiB-positive group and the PiB-negative group and three-dimensionally visualizing the regions.

FIG. 19 illustrates diagrams obtained by mapping, onto the brain surface, regions in which there are statistically significant differences between the means of the PADRE signal intensities in the cortex analyzed by ROI based on the AAL atlas for each of the PiB-positive group and the PiB-negative group and three-dimensionally visualizing the regions. In FIG. 19, a darker region indicates a clearer difference between groups. An image g561 is an outer image of a left hemisphere, and an image g562 is an inner cross-sectional image of the left hemisphere. An image g571 is an outer image of a right hemisphere, and an image g562 is an inner cross-sectional image of the right hemisphere. In the images g561, g562, g571, and g572, the darkest region has, for example, p<0.001, a region g551 has, for example, p<0.01, and a region g552 is, for example, p<0.05.

As illustrated in FIG. 16 to FIG. 18, the PADRE signal intensity tends to decrease to a certain extent in the positive group than in the negative group. Further, as illustrated in FIG. 19, the PiB-positive group has a low signal intensity in a vicinity of a parietal-occipital lobe.

Figure 20:
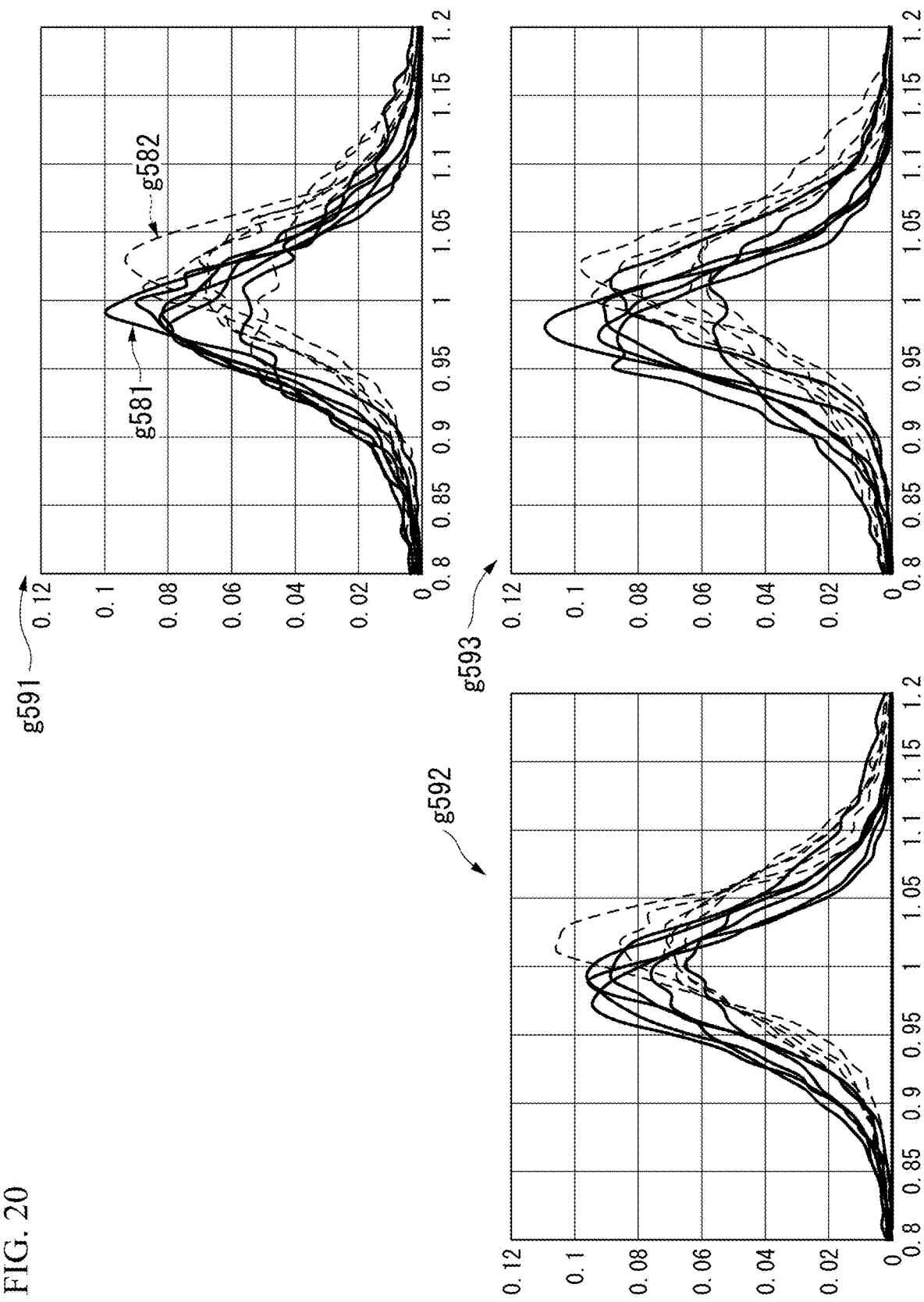
FIG. 20 illustrates graphs of color-coded histograms of the PADRE signal intensities with respect to voxel values included in a brain local cortex analyzed by ROI based on the AAL atlas for the PiB-positive group and the PiB-negative group.

FIG. 20 illustrates graphs of color-coded histograms of the PADRE signal intensities with respect to voxel values included in a brain local cortex analyzed by ROI based on the AAL atlas for the PiB-positive group and the PiB-negative group. A graph g591 illustrates distributions for the negative group and the positive group in the right superior occipital gyrus, a graph g592 illustrates distributions for the negative group and the positive group in a right medial occipital gyrus, and a graph g593 illustrates distributions for the negative group and the positive group in the superior parietal lobule (left). In the graphs g591 to g593, a distribution g581 is a distribution for the positive group, and a distribution g582 is a distribution for the negative group. Further, in the graphs g591 to g593, a horizontal axis represents a normalized PADRE signal intensity value, and a vertical axis represents the number of pixels. In the graphs g591 to g593, each line of the distributions is data for each subject. As illustrated in FIG. 20, the positive group is distributed in lower signal intensity values than the negative group.

FIG. 20 suggests a possibility that either the punctate component or the diffuse component (background component) in the cortex reflects the amyloid β. Therefore, in the present embodiment, the punctate component and the diffuse component in the cortex are separated.

(Separation of Punctate Component and Diffuse Component in Cortex)

Next, a separation processing procedure for separating the local low signal intensity component and the diffuse component will be described.

Figure 21:
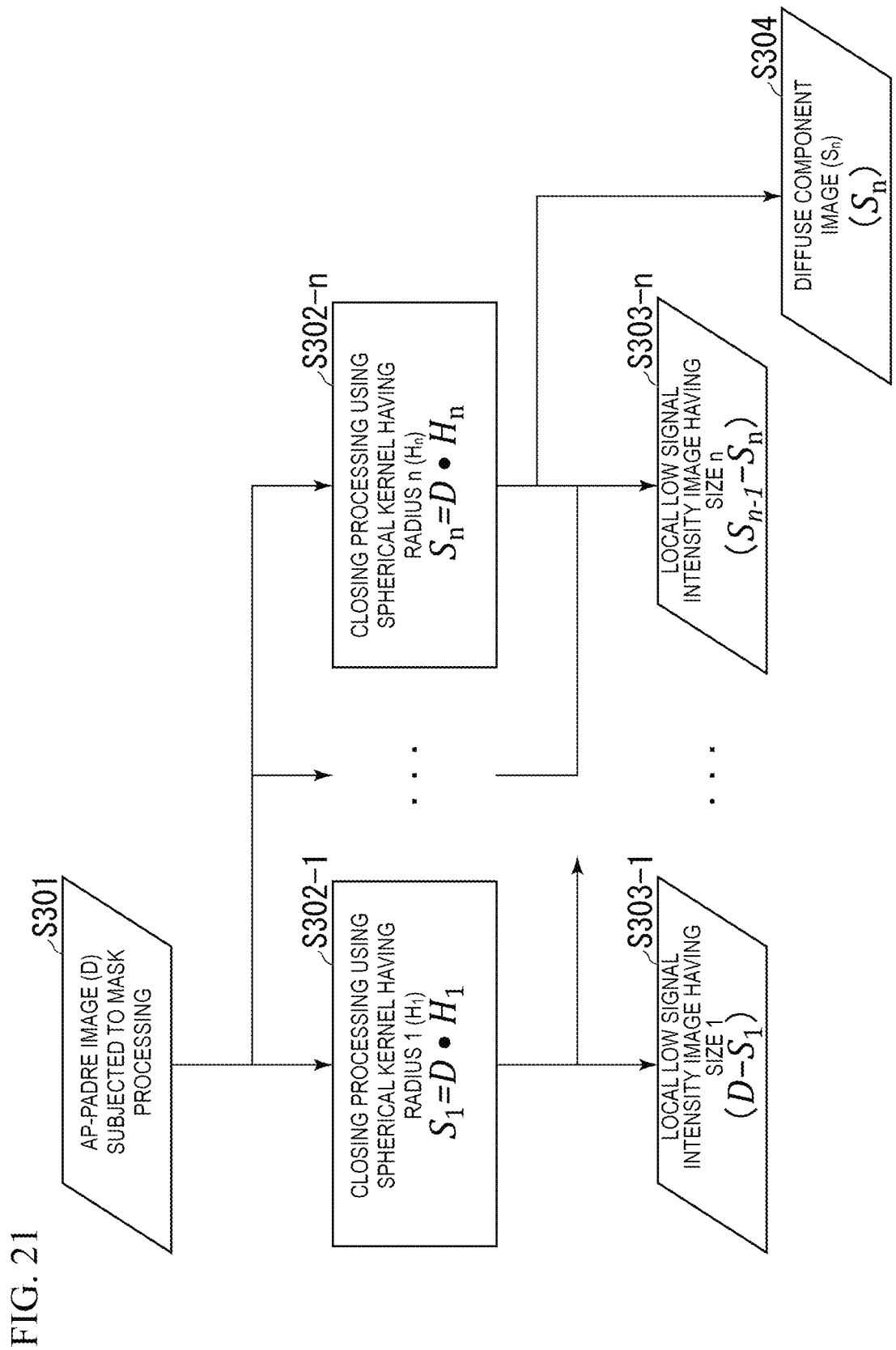
FIG. 21 is a flowchart of separation processing of a local low signal intensity component and a diffuse component according to the embodiment.
Figure 22:
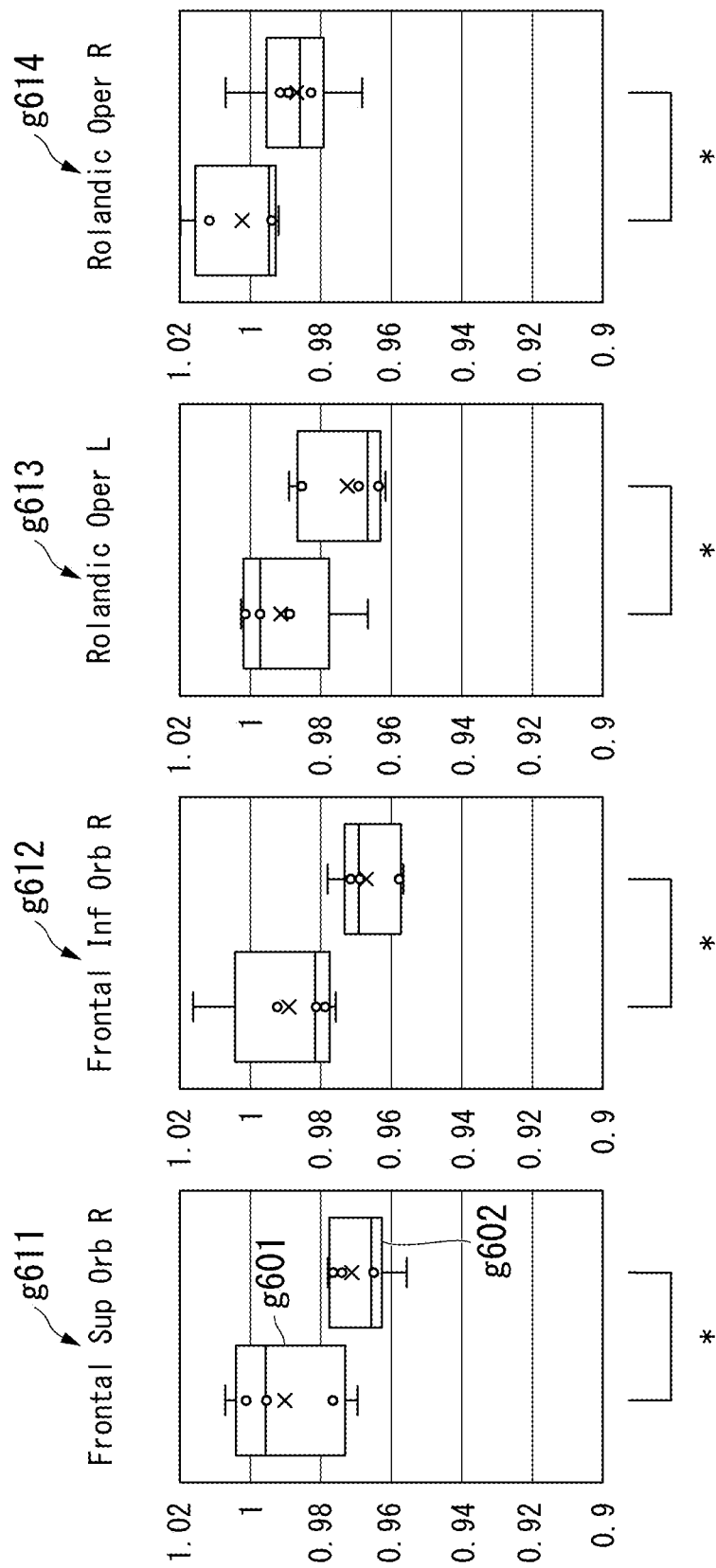
FIG. 22 is a diagram illustrating means of normalized PADRE signal intensity values in ROI in a diffuse component image for each of the PiB-positive group and the PiB-negative group.
Figure 23:
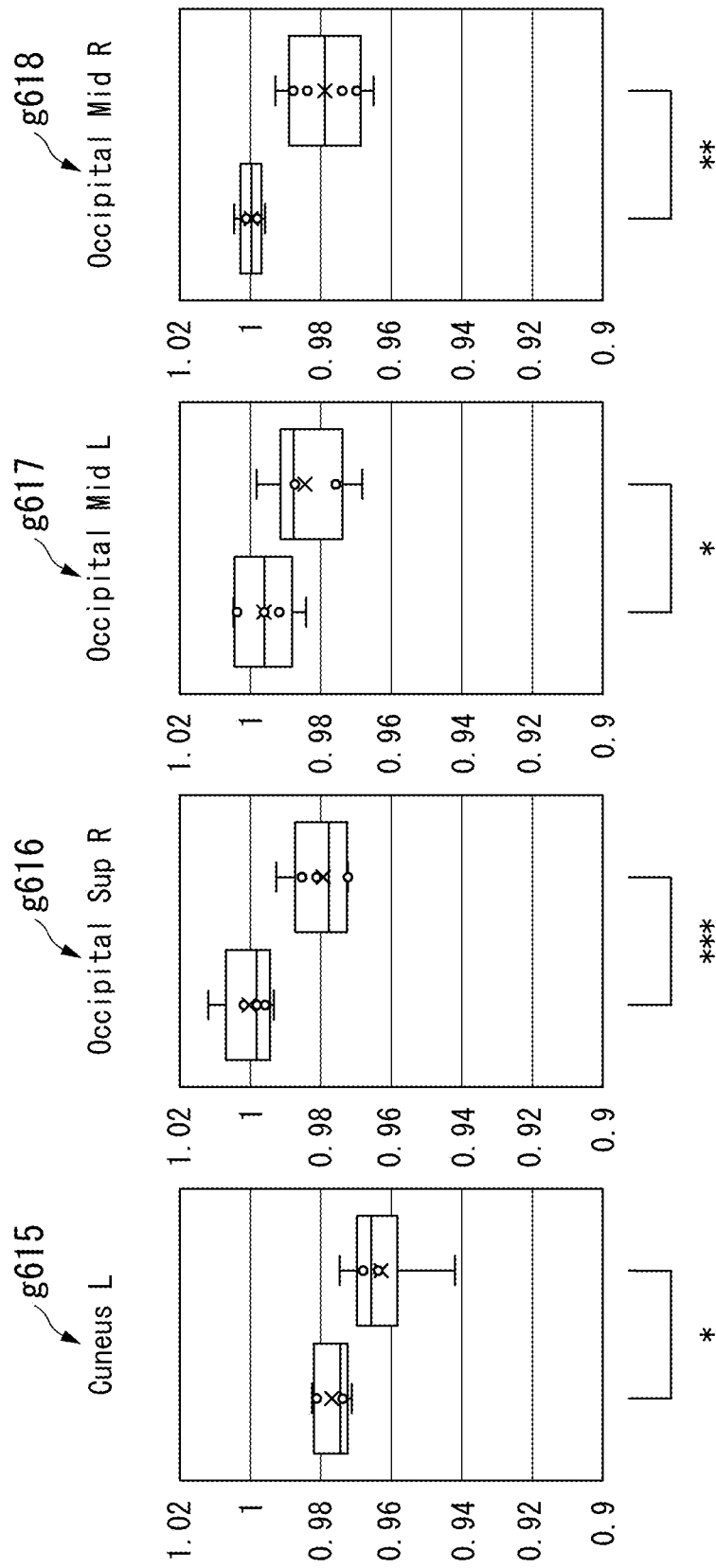
FIG. 23 is a diagram illustrating means of the normalized PADRE signal intensity values in ROI in the diffuse component image for each of the PiB-positive group and the PiB-negative group.
Figure 24:
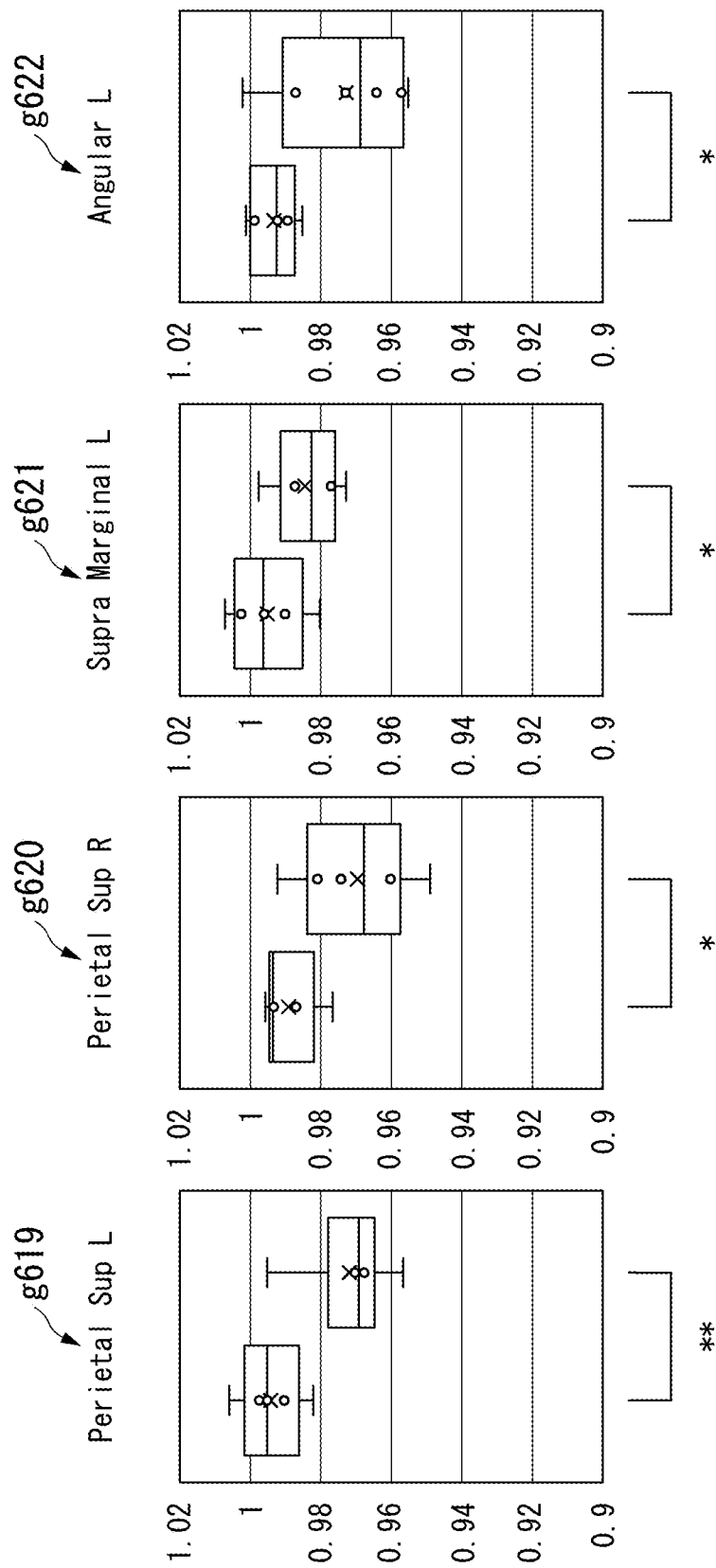
FIG. 24 is a diagram illustrating means of the normalized PADRE signal intensity values in ROI in the diffuse component image for each of the PiB-positive group and the PiB-negative group.
Figure 25:
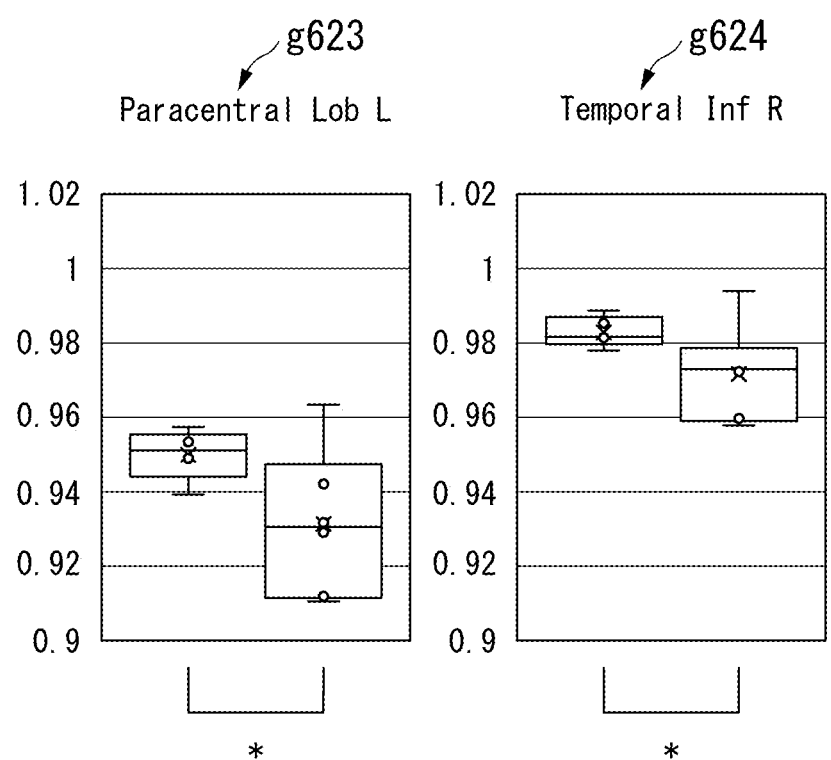
FIG. 25 is a diagram illustrating means of the normalized PADRE signal intensity values in ROI in the diffuse component image for each of the PiB-positive group and the PiB-negative group.

FIG. 21 is a flowchart of separation processing of the local low signal intensity component and the diffuse component according to the present embodiment.

(Step S301) The separation unit 18 acquires an AP-PADRE image (D) subjected to the mask processing by the mask processing unit 17.

(Step S302-$p$) ($p$ is an integer of 1 to n) The separation unit 18 performs closing processing according to the following Equation (5) by morphological operation processing using a spherical kernel having a radius of p pixels (Hp). The separation unit 18 may perform the processing in steps S302-1 to S302-$n$ in parallel or by time-division processing.

[Math. 5]

$$S_p = D \cdot H_p \tag{5}$$

(Step S303-1) The separation unit 18 separates a local low signal intensity having a size 1 by calculating the local low signal intensity having a size 1 according to the following Formula (6) by morphological operation processing.

[Math. 6]

$$(D - S_1) \tag{6}$$

(Step S303-$n$) The separation unit 18 separates a local low signal intensity having a size n by calculating the local low signal intensity having a size n according to the following Formula (7) by morphological operation processing.

[Math. 7]

$$(S_{n-1} - S_n) \quad (7)$$

(Step S304) The separation unit 18 outputs n pieces of S1 to Sn calculated in steps S302-1 to S302-$n$ as diffuse component images.

(Third Verification)

Next, results of comparing and verifying the PADRE signal intensities of the diffuse components in each region of ROI between the PiB-PET-positive group and the PiB-PET-negative group will be described with reference to FIG. 22 to FIG. 27.

FIG. 22 to FIG. 25 are diagrams illustrating means of the normalized PADRE signal intensity values in ROI of the diffuse component image for each of the PiB-positive group and the PiB-negative group. In each graph g611 to g624 in FIG. 22 to FIG. 25, a left item g601 is a result for the negative group, and a right item g602 is a result for the positive group. Further, in each graph g611 to g624 in FIG. 22 to FIG. 25, a vertical axis represents a normalized signal intensity value of the diffuse component in the PADRE image. Each graph g611 to g624 in FIG. 22 to FIG. 25 is a result of ROI analysis for an image of only the diffuse component after removal of a patchy component (a low signal intensity component) in each region.

The graph g611 is a result for an orbital portion of a superior frontal lobe (right) (Frontal Sup Orb R). The graph g612 is a result for an orbital portion of the inferior frontal lobe (right) (Frontal Inf Orb R). The graph g613 is a result for the rolandic operculum (left) (Rolonic Oper L). The graph g614 is a result for the rolandic operculum (right) (Rolonic Oper L).

The graph g615 is a result for the cuneus (left) (Cuneus L). The graph g616 is a result for the right superior occipital gyrus (Occipital Sup R). The graph g617 is a result for the left middle occipital gyrus (Occipital Mid L). The graph g618 is a result for the right middle occipital gyrus (Occipital Mid R).

The graph g619 is a result for the superior parietal lobule (left) (Parietal Sup L). The graph g620 is a result for the superior parietal lobule (right) (Parietal Sup L). The graph g621 is a result for the supramarginal gyrus (right) (Supra Marginal R). The graph g622 is a result for a left angular gyrus (Angular L).

The graph g623 is a result for the paracentral lobule (left) (Paracentral Lob L). The graph g624 is a result for an inferior temporal gyrus (right) (Temporal Inf L).

In FIG. 22 to FIG. 25, differences between the negative group and the positive group are clearer than that in FIG. 16 to FIG. 18.

This indicates that the diffuse component tends to reflect the amyloid β.

(Fourth Verification)

Based on the result in the third verification, after a blood vessel image portion is masked from the PADRE image and a patchy low signal intensity component is removed, only the PADRE signal intensity of the diffuse component is extracted and projected onto the brain surface for display, and an image interpretation experiment is performed.

FIG. 26 illustrates examples of images obtained by projecting, onto the brain surface, means of the diffuse components extracted from the PADRE images for the PiB-negative group and the PiB-positive group. In FIG. 26, an image g701 is an image obtained by projecting the means of the negative group, and an image g702 is an image obtained by projecting the means of the positive group. Further, a region g711 is a region with a high signal intensity (=a low level of amyloid β). A region g712 is a region with a relatively low PADRE signal intensity.

From FIG. 26, it is visually understood that the signal intensity in the parietal-occipital lobe is high in the negative group, and the signal intensity in the parietal-occipital lobe is lower in the positive group than in the negative group.

(Evaluation for Each Case)

Next, an example in which the method according to the present embodiment is applied to each case will be described with reference to FIG. 27 to FIG. 30.

Figure 27:
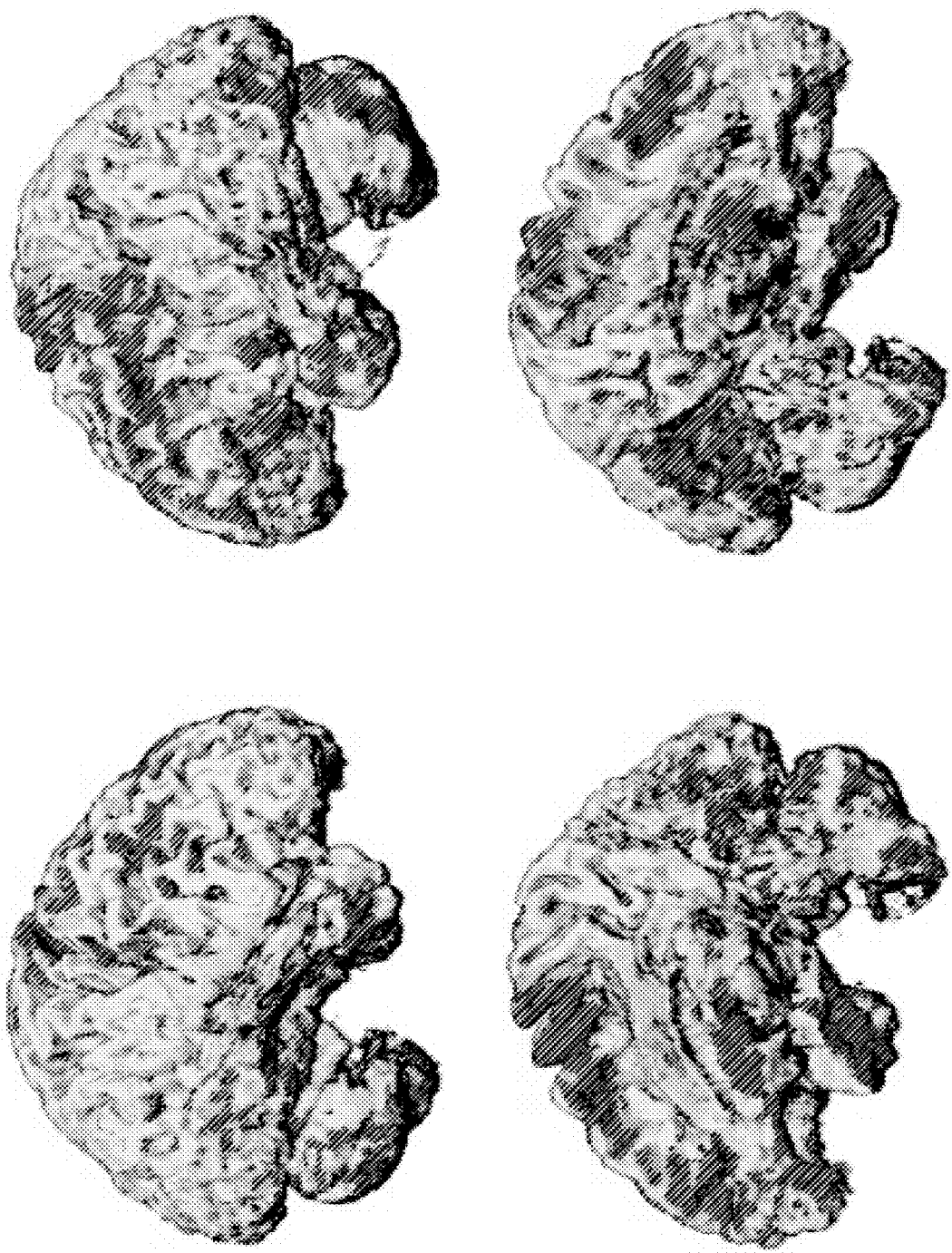
FIG. 27 illustrates images obtained by removing blood vessels and low signal intensities from an MRI image of a PiB-negative person with spinocerebellar degeneration by a method according to the embodiment, and mapping the extracted diffuse components onto the brain surface.

FIG. 27 illustrates images obtained by removing blood vessels and low signal intensities from an MRI image of a PiB-negative person with spinocerebellar degeneration (SCD) using the method according to the present embodiment, and mapping the extracted diffuse components onto the brain surface.

As interpretation results for the images by three doctors (a diagnostic radiologist, a brain surgeon, and a physician), there are three results that determine that the amyloid β deposition is negative.

Figure 28:
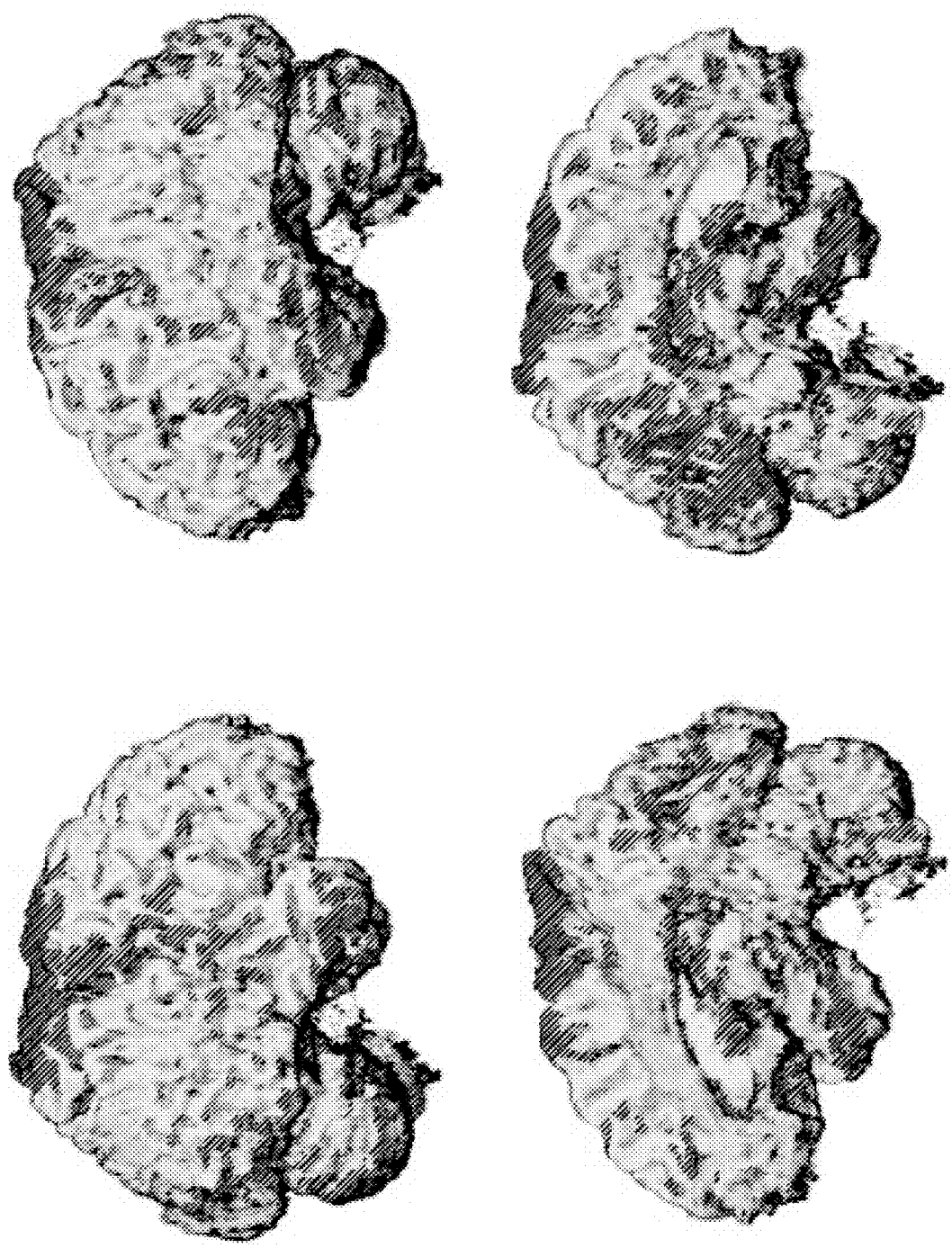
FIG. 28 illustrates images obtained by removing blood vessels and low signal intensities from an MRI image of a healthy PiB-negative person (NC) using the method according to the embodiment, and mapping the extracted diffuse components onto the brain surface.

FIG. 28 illustrates images obtained by removing blood vessels and low signal intensities from an MRI image of a healthy PiB-negative person (NC) using the method according to the present embodiment, and mapping the extracted diffuse components onto the brain surface.

As interpretation results for the images by three doctors, there are three results that determine that the amyloid β deposition is negative.

FIG. 29 illustrates images obtained by removing blood vessels and low signal intensities from an MRI image of a PiB-positive person with mild cognitive impairment (MCI due to AD) using the method according to the present embodiment, and mapping the extracted diffuse components onto the brain surface.

As interpretation results for the images by three doctors, there are three results that determine that the amyloid β deposition is positive.

Figure 30:
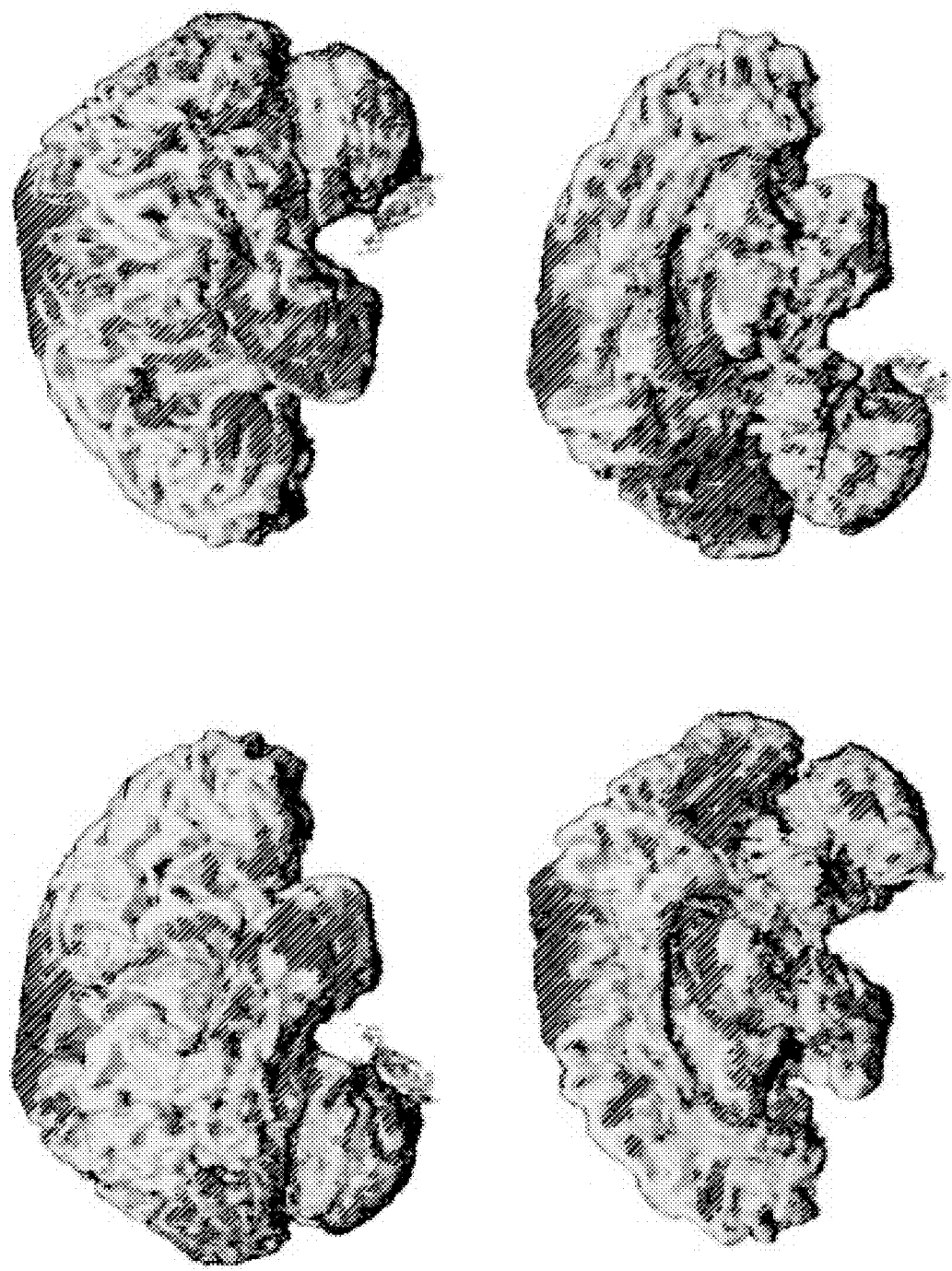
FIG. 30 illustrates images obtained by removing blood vessels and low signal intensities from an MRI image of a PiB-positive person with mild cognitive impairment using the method according to the embodiment, and mapping the extracted diffuse components onto the brain surface.

FIG. 30 illustrates images obtained by removing the blood vessels and the low signal intensities from the MRI image of the PiB-positive person with mild cognitive impairment (MCI due to AD) using the method according to the present embodiment, and mapping the extracted diffuse components onto the brain surface.

As interpretation results for the images by three doctors, there are three results determined as positive.

FIG. 31 is a table illustrating interpretation results for 11 subjects including FIG. 27 to FIG. 30.

In FIG. 31, an upper table g801 illustrates interpretation determination results. In the table g801, indicates a result determined as negative, and "+" indicates a result determined as positive. The term "positive" refers to a case in which it is determined that "the amyloid β is deposited".

In FIG. 31, a lower table g802 illustrates results of evaluating the determination result of each doctor in the table g801.

As illustrated in FIG. 31, as a result of doctors interpreting the images obtained by using the method according to the present embodiment, the amyloid β deposition can be predicted with high accuracy.

Here, AP-PADRE used in the present embodiment will be further described.

As iron present in the cerebral cortex, there can be adopted a two components model assuming that iron includes two types of iron, that is, age-related iron that accumulates with aging and amyloid iron that accumulates with amyloid accumulation. In the present embodiment, AP-PADRE uses this two components model and visualizes amyloid β-bound iron in an enhanced manner by a difference in phase difference.

Regarding the age-related iron, in the related art, research has been conducted to evaluate and predict iron accompanying amyloid β (amyloid iron) and iron accumulated with aging (age-related iron) as a whole amount without distinguishing them from each other based on a quantitative value referred to as QSM obtained based on phase component information on an MRI image, for example. Therefore, in the related art, the amyloid iron and the age-related iron are not distinguished from each other. In contrast, in the present embodiment, information based on the amyloid iron is detected by distinguishing the amyloid iron from the age-related iron.

Although an example in which max is used has been described in Equation (1) and Equation (3) described above, sup may be used instead of max. Further, although an example in which mix is used has been described in Equation (2) and Equation (4) described above, inf may be used instead of mix.

The verification results will be further described.

An example of extracting a component other than the diffuse component from the AP-PADRE image will be described by taking a punctate component image as an example. In this case, the punctate component image is extracted from the image obtained by removing the blood vessel structure from the AP-PADRE image using the blood vessel mask image.

Figure 32:
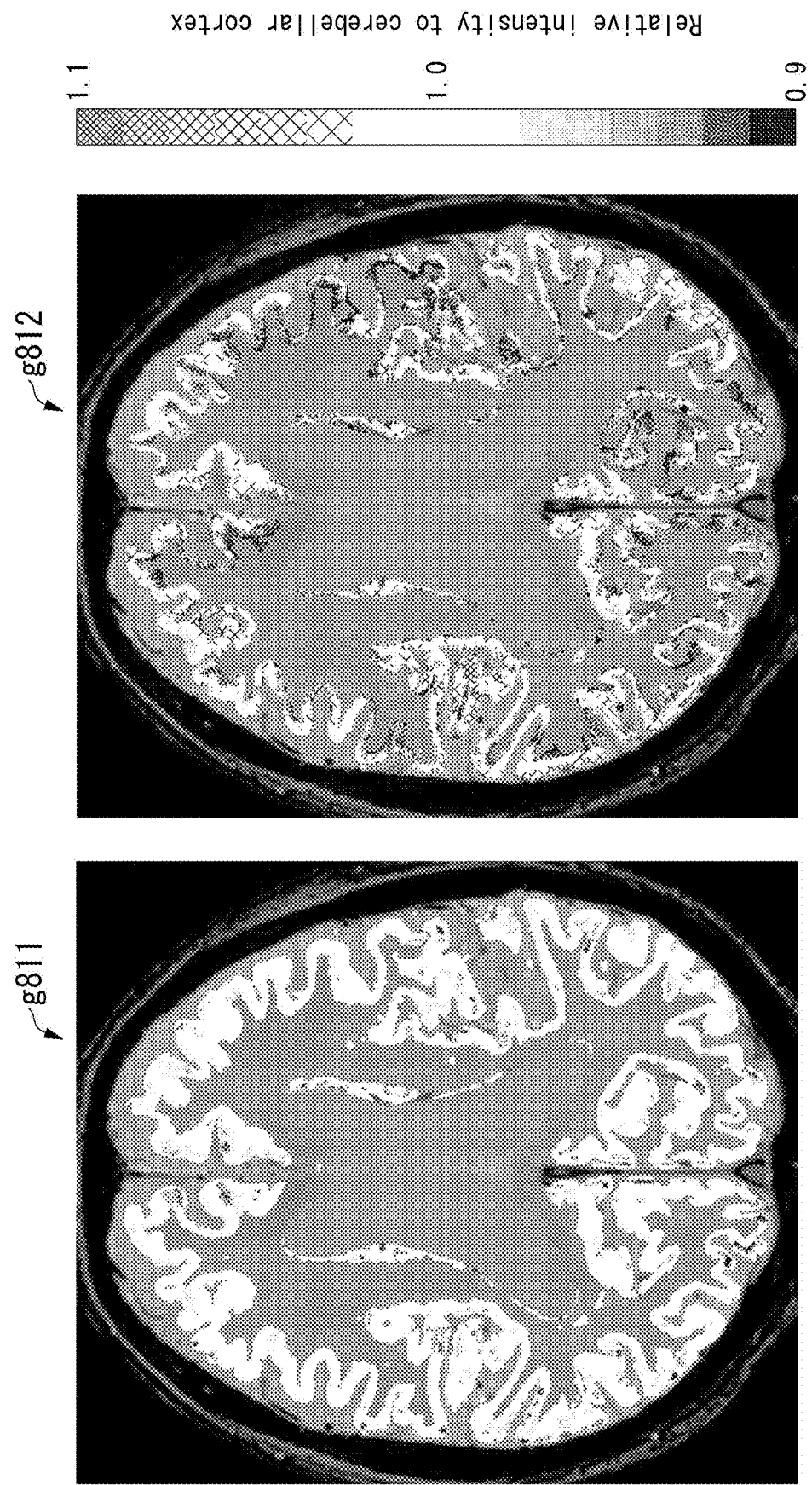
FIG. 32 illustrates a punctate component image and a diffuse component image created from an AP-PADRE image of a patient with MCI due to Alzheimer's disease.

FIG. 32 illustrates a punctate component image and a diffuse component image created from an AP-PADRE image of a patient with mild cognitive impairment (MCI) due to Alzheimer's disease.

It can be seen that a punctate component image g811 can be easily recognized from an original AP-PADRE image due to a high contrast. On the other hand, although a diffuse component image g812 has a large signal intensity difference, it is difficult to recognize the diffuse component image g812 in the original AP-PADRE image due to a low contrast.

Figure 33:
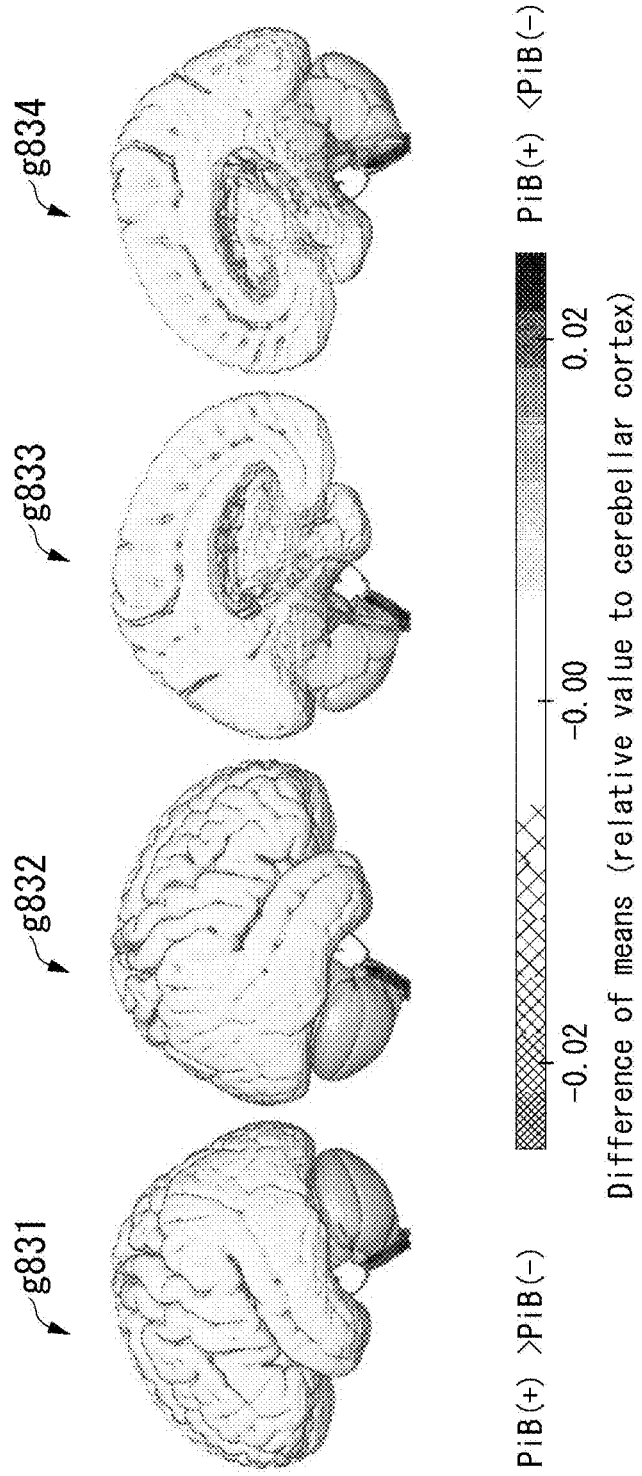
FIG. 33 illustrates images obtained by calculating signal intensity differences of means of cerebellum-normalized signal intensities in the punctate component image of AP-PADRE in each ROI for each of the PiB-positive group and the PiB-negative group, and projecting the calculated signal intensity differences onto the brain surface with a color map.
Figure 34:
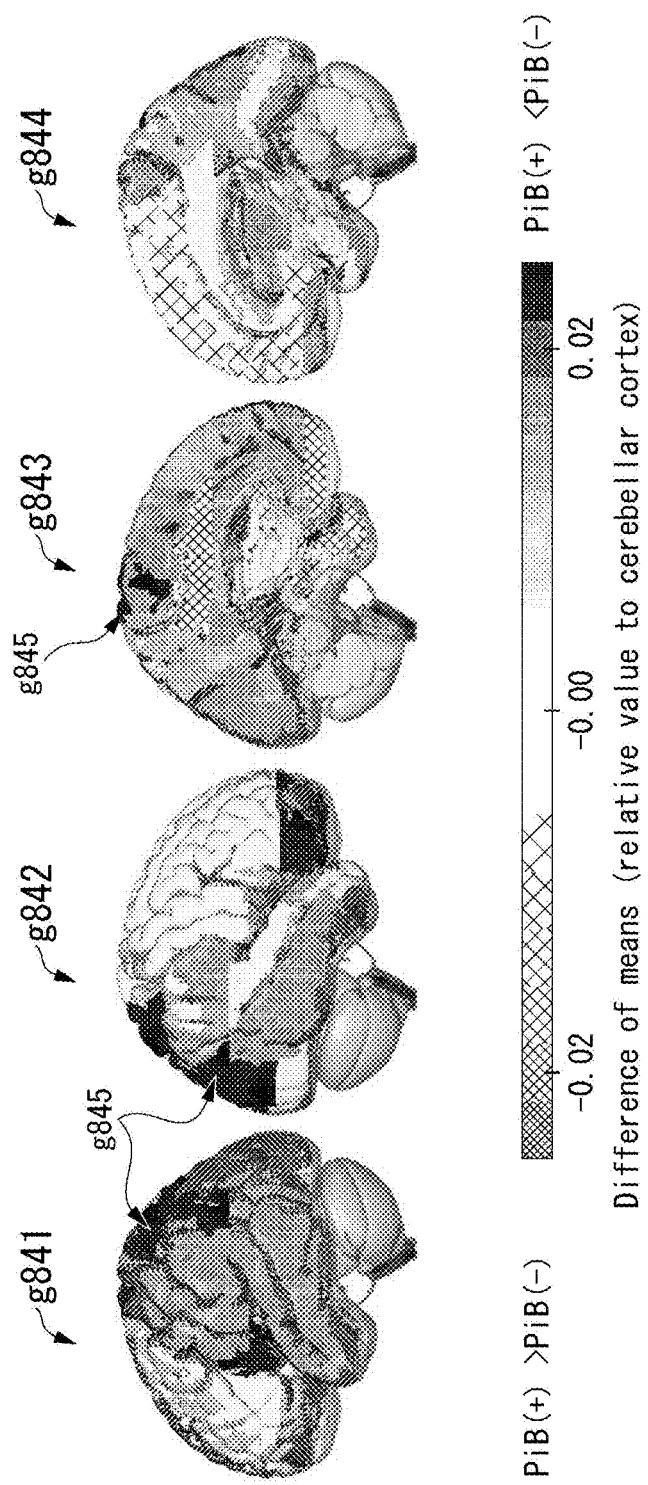
FIG. 34 illustrates images obtained by calculating signal intensity differences of means of cerebellum-normalized signal intensities in the diffuse component image of AP-PADRE in each ROI for each of the PiB-positive group and the PiB-negative group, and projecting the calculated signal intensity differences onto the brain surface with a color map.

FIG. 33 illustrates images obtained by calculating signal intensity differences of means of cerebellum-normalized signal intensities in the punctate component image of AP-PADRE in each ROI for each of the PiB-positive group and the PiB-negative group, and projecting the calculated signal intensity differences onto the brain surface with a color map. FIG. 34 illustrates images obtained by calculating signal intensity differences of means of cerebellum-normalized signal intensities in the diffuse component image of AP-PADRE in each ROI for each of the PiB-positive group and the PiB-negative group, and projecting the calculated signal intensity differences onto the brain surface with a color map. In FIG. 33 and FIG. 34, color images are illustrated in a grayscale manner. In FIGS. 33 and 34, images g831, g832, g841, and g842 are side views. Images g833, g834, g843, and g844 are cross-sectional views. Further, a dark region g845 indicates that a PiB (−) value of the negative group has a higher signal intensity value than that of a PiB (+) value of the positive group, and the signal intensity difference is large.

As illustrated in FIG. 33, there is little difference between groups in the punctate component image. On the other hand, as illustrated in FIG. 34, it can be seen that, in the diffuse component image, the PiB positive group tends to have lower overall signal intensity values than the negative group.

In each embodiment, verification, and the like, the local low signal intensity, the punctate, and the patchy are used in the same meaning.

(Fifth Verification)

In a fifth verification, quantitative analysis using AAL atlas is performed on AP-PADRE images of 191 patients who have visited the Aging and Geriatrics Department of Tohoku University Hospital with a main complain about forgetfulness. In the verification, the patients are divided into three groups based on comprehensive diagnostic names obtained from symptoms and progress of the cases, past medical history and comorbidities, a psychological examination, a blood examination, a brain MRI examination, a cerebral blood flow single photon emission computed tomography (SPECT) examination, and the like. The first group is referred to as a non-AD group, and includes patients with normal cognitive function and patients with dementia due to causes other than Alzheimer's disease. The second group includes patients with MCI due to Alzheimer's disease. The third group includes patients with Alzheimer's dementia (AD).

In the verification, AP-PADRE images are subjected to morphological analysis to create diffuse component images, and signal intensities are normalized by dividing by signal intensities of the cerebellar cortex or hippocampus. Further, in the verification, average signal intensity values of the images on 90 gray matter regions in ROI using AAL atlas are calculated, a one-tailed t-test is performed between two groups to verify whether there is a difference in the mean of each group. FIG. 35 to FIG. 37 are tables illustrating results for the Non-AD group versus the MCI group+Alzheimer's dementia group in the fifth verification. FIG. 38 to FIG. 40 are tables illustrating results of the one-tailed t-test of the Non-AD group versus the Alzheimer's dementia group in the fifth verification. FIG. 41 to FIG. 43 are tables illustrating results of a one-tailed t-test of similar ROI analysis results in both the PiB-negative group and the PiB-positive group for 11 cases having PiB data in the fifth verification. In FIG. 35 to FIG. 43, notations are p values, and p<0.05 is taken as a statistical significance level. The AD group is an Alzheimer's dementia group, the Non-AD group is a non-Alzheimer's dementia group, and the MCI group is a mild cognitive impairment group.

In FIG. 35 to FIG. 43, values on left are cerebellum normalized values, and values on right are hippocampus normalized values. Further, a table g851 in FIG. 35, a table g861 in FIG. 38, and a table g871 in FIG. 41 are results for the regions Precentral L to Rolandic Oper L. A table g852 in FIG. 35, a table g862 in FIG. 38, and a table g872 in FIG. 41 are results for the regions Rolandic Oper R to Hippocampus L. A table g853 in FIG. 36, a table g863 in FIG. 39, and a table g873 in FIG. 42 are results for the regions Hippocampus R to Postcentral L. A table g854 in FIG. 36, a table g864 in FIG. 39, and a table g874 in FIG. 42 are results for the regions Postcentral R to Thalamus L. A table g855 in FIG. 37, a table g865 in FIG. 40, and a table g875 in FIG. 43 are results for the regions Thalamus R to Temporal R.

As illustrated in FIG. 35 to FIG. 37, in the non-AD group versus MCI group+AD group, in a case of normalization with cerebellum, signal intensity reductions in the MCI+AD group are observed in 21 regions out of 90 regions of the brain. In a case of normalization with hippocampus, signal intensity reductions in the AD group are observed in 69 regions out of 90 regions.

Next, as illustrated in FIG. 38 to FIG. 40, when the non-AD group and the AD group are compared with each other, signal intensity reductions in the AD group are observed in 23 regions out of 90 regions in a cerebellar normalized image and in 79 regions out of 90 regions in a hippocampal normalized image.

As illustrated in FIG. 41 to FIG. 43, signal intensity reductions in the PiB-positive group are observed in 14 regions out of 90 regions in the cerebellar normalized image. On the other hand, signal intensity reductions in the PiB-positive group are observed in 3 regions out of 90 regions in the hippocampal normalized image.

In a study on clinical cases, it is expected that the hippocampus signal intensity in the diffuse component image of the AP-PADRE has a high correlation with age and MMSE, and a signal intensity increase mainly reflecting structural atrophy of the hippocampus is observed. In Alzheimer's dementia, region-selective pathological atrophy occurs around the hippocampus. In a case of a study based on clinical diagnosis, a large number of AD patients with obvious pathological atrophy of the hippocampus in an advance stage are included. Therefore, it is considered that, in a case in which the normalization is performed with the hippocampus signal intensity, a discrimination ability for Alzheimer's dementia is improved by a synergistic effect of the amyloid-related signal intensity reduction by AP-PADRE and the signal intensity increase by hippocampal atrophy specific to Alzheimer's dementia. On the other hand, in a study on relevance to PiB in a small number of cases including MCI with little hippocampal atrophy, early Alzheimer's dementia patients, non-Alzheimer's dementia patients with hippocampal atrophy, and healthy subjects, it is considered that the amyloid-specific signal intensity reduction by AP-PADRE is offset by inclusion of hippocampal atrophy information through normalization with the hippocampal signal intensity, and the discrimination ability is reduced.

In the embodiment described above, as an example of the phase difference enhanced image created from the MRI image, the AP-PADRE image created by the amyloid β-bound iron-phase difference enhanced imaging method that enhances amyloid β-bound iron has been described, but the phase difference enhanced image is not limited to this.

As described above, in the present embodiment, an image in which the presence or absence of the amyloid β can be visually evaluated is created by performing the mask of the blood vessel structure and the separation of the local low signal intensity component (the punctate component) and the diffuse component on the AP-PADRE image by the morphological operation processing.

An evaluation for the amyloid β deposition in the brain, which is conducted in the related art, is invasive because a cerebrospinal fluid examination or amyloid PET is conducted, cost for the examination is high, and exposure to radiation is accompanied.

In contrast, according to the present embodiment, since image processing is performed at the time of imaging an MRI image, exposure to radiation due to PET can be eliminated, and inexpensive examinations can be provided. For example, the present embodiment is also applicable to examinations such as brain checkup, and has a potential to efficiently identify pre-onset Alzheimer's disease at an early stage, making a major breakthrough for dementia diagnosis and treatment.

Further, in the example described above, the interpretation is performed for Alzheimer's dementia, but the invention is not limited to this. Using the image processed by the method according to the present embodiment, it is also possible to determine non-Alzheimer's dementia (CBDS: corticobasal ganglia degeneration) and the like by the interpretation. In a clinical field of dementia, effective therapeutic methods differ depending on whether the disease is Alzheimer's disease or other pathology, and incorrect therapeutic methods may cause side effects. If the cause of a patient with dementia can be estimated by using the image according to the present embodiment, it is considered to be very useful in a treatment strategy for dementia.

Although the term "amyloid β" has been used in the above description, the "amyloid β" is also used to mean "amyloid plaque" in each embodiment, each example, each verification example, and the like.

The image processing device 1 according to the present embodiment may be included in an MRI imaging apparatus or the like. The image processing device 1 may be, for example, a personal computer.

A program for implementing all or part of functions of the image processing device 1 according to the invention may be recorded in a computer-readable recording medium, and all or part of the processing of the image processing device 1 may be performed by causing a computer system to read and execute the program recorded in the recording medium. The "computer system" here includes an OS and hardware such as a peripheral device. Further, the "computer system" also includes a WWW system having a home page providing environment (or display environment). Further, the "computer-readable recording medium" refers to a portable medium such as a flexible disk, a magneto-optical disk, a ROM, and a CD-ROM, or a storage device such as a hard disk built in a computer system. Further, the "computer-readable recording medium" also includes one that holds a program for a certain period of time, such as a volatile memory (RAM) in a computer system serving as a server or a client when the program is transmitted via a network such as the Internet or a communication line such as a telephone line.

Further, the program may be transmitted from computer system in which the program is stored in a storage device or the like to another computer system via a transmission medium or a transmission wave in the transmission medium. Here, the "transmission medium" that transmits the program refers to a medium having a function of transmitting information, such as a network (communication network) such as the Internet or a communication line (communication wire) such as a telephone line. Further, the program may be for implementing a part of the above-described functions. Further, the program may be a so-called difference file (difference program) that can implement the above-described functions in combination with a program already recorded in the computer system.

Although the embodiments for carrying out the invention have been described using the embodiment, the invention is not limited to the embodiment, and various modifications and substitutions can be made without departing from the gist of the invention.

REFERENCE SIGNS LIST

1: image processing device
11: image acquisition unit
12: blood vessel enhanced image generation unit
13: bias field correction unit
14: blood vessel mask creation unit
15: AP-PADRE image generation unit
16: bias field correction unit
17: mask processing unit
18: separation unit
19: brain surface projection image output unit 20: 3D-T1 weighted image generation unit
21: alignment unit
22: anatomical standardization unit
23: coordinate transformation unit
24: statistical image analysis result output unit
25: template storage unit
26: coordinate transformation unit
27: mask processing unit
28: region of interest analysis result output unit

The invention claimed is:

1. An image processing method comprising:
creating, by a blood vessel mask creation unit, a blood vessel mask image by removing a punctate low signal intensity, removing a linear low signal intensity, extracting the linear low signal intensity, removing a punctate high signal intensity, removing a linear high signal intensity, and extracting the linear high signal intensity from an image obtained from a magnetic resonance signal intensity in which a region corresponding to a blood vessel is enhanced with respect to an MRI image; and
generating, by a mask processing unit, an image in which a blood vessel structure is removed using the blood vessel mask image from a phase difference enhanced image created from the MRI image.

2. The image processing method according to claim 1, further comprising:
separating, by a separation unit, a local low signal intensity and a diffuse component from the image from which the blood vessel structure has been removed; and
generating, by a brain surface projection image output unit, a brain surface projection image by projecting the diffuse component onto a brain surface.

3. The image processing method according to claim 2, wherein:
the blood vessel mask creation unit creates the blood vessel mask image by morphological operation processing, and
the separation unit separates the local low signal intensity and a diffuse component image by the morphological operation processing.

4. The image processing method according to claim 1, wherein the blood vessel mask creation unit performs the following steps:
removing the punctate low signal intensity by morphological operation processing using 3×3×3 linear kernels in 13 directions,
removing the linear low signal intensity from the image from which the punctate low signal intensity has been removed, by morphological operation processing using 3×3×3 planar kernels in 13 directions,
extracting the linear low signal intensity using the image from which the punctate low signal intensity has been removed and the image from which the linear low signal intensity has been removed,
removing the punctate high signal intensity by morphological operation processing using 3×3×3 linear kernels in 13 directions,
removing the linear high signal intensity from the image from which the punctate high signal intensity has been removed, by morphological operation processing using 3×3×3 planar kernels in 13 directions, and
extracting the linear high signal intensity using the image from which the punctate high signal intensity has been removed and the image from which the linear high signal intensity has been removed.

5. The image processing method according to claim 3, wherein:
the blood vessel mask creation unit performs, for different pixel widths, processing of removing the punctate low signal intensity, processing of removing the linear low signal intensity, processing of extracting the linear low signal intensity, processing of removing the punctate high signal intensity, processing of removing the linear high signal intensity, and processing of extracting the linear high signal intensity.

6. The image processing method according to claim 2, wherein the separation unit performs the following steps:
separating the local low signal intensity having a size n by performing closing processing on the image from which the blood vessel structure has been removed, by morphological operation processing using a spherical kernel having a radius of p (p is an integer of 1 or more and n or less) pixels, and
separating a diffuse image using p results obtained by performing, using a spherical kernel having a radius of n pixels, closing processing on the image from which the blood vessel structure has been removed.

7. The image processing method according to claim 1, wherein:
the phase difference enhanced image is an AP-PADRE image created from the MRI image by an amyloid β-bound iron-phase difference enhanced imaging method.

8. The image processing method according to claim 1, wherein;
the blood vessel mask creation unit extracts information on a region of interest using the blood vessel mask image.

9. The image processing method according to claim 1, wherein;
the blood vessel mask creation unit extracts information on a region of interest by performing mask processing based on the blood vessel mask image, a template of the region of interest, information obtained by matching the acquired enhanced image to the phase difference enhanced image and aligning both images, and information obtained by transforming standardized information into an individual brain coordinate based on information obtained from a transformation vector field between the individual brain coordinate and a standard brain coordinate by transforming the enhanced image by nonlinear transformation and matching the transformed image with a template image of the enhanced image on the standard brain coordinate.

10. A non-transitory computer readable storage medium which stores a program for causing a computer to:
create a blood vessel mask image by removing a punctate low signal intensity, removing a linear low signal intensity, extracting the linear low signal intensity, removing a punctate high signal intensity, removing a linear high signal intensity, and extracting the linear high signal intensity from an image obtained from a magnetic resonance signal intensity in which a region corresponding to a blood vessel is enhanced with respect to an MRI image; and
generate an image in which a blood vessel structure is removed using the blood vessel mask image from a phase difference enhanced image created from the MRI image.

11. An image processing device comprising:
a blood vessel mask creation unit configured to create a blood vessel mask image by removing a punctate low signal intensity, removing a linear low signal intensity, extracting the linear low signal intensity, removing a punctate high signal intensity, removing a linear high signal intensity, and extracting the linear high signal intensity from an image obtained from a magnetic resonance signal intensity in which a region corresponding to a blood vessel is enhanced with respect to an MRI image; and a mask processing unit configured to generate an image in which a blood vessel structure is removed using the blood vessel mask image from a phase difference enhanced image created from the MRI image.

12. The image processing device according to claim 11, wherein:

the blood vessel mask creation unit extracts information on a region of interest using the blood vessel mask image.

\* \* \* \* \*